United States Patent
Mettyear et al.

(10) Patent No.: US 9,715,618 B2
(45) Date of Patent: Jul. 25, 2017

(54) DYNAMIC HANDWRITING VERIFICATION AND HANDWRITING-BASED USER AUTHENTICATION

(71) Applicant: Wacom Co., Ltd., Kazo-shi, Saitama (JP)

(72) Inventors: Nicholas Mettyear, Salisbury (GB); Yoshitaka Nakayama, Kawasaki (JP); Jin Kon Ryu, Seoul (KR)

(73) Assignee: Wacom Co., Ltd., Kazo-shi (JP)

( * ) Notice: Subject to any disclaimer, the term of this patent is extended or adjusted under 35 U.S.C. 154(b) by 0 days.

(21) Appl. No.: 14/940,925

(22) Filed: Nov. 13, 2015

(65) Prior Publication Data

US 2016/0070951 A1    Mar. 10, 2016

Related U.S. Application Data

(63) Continuation of application No. 14/080,723, filed on Nov. 14, 2013, now Pat. No. 9,235,748.

(51) Int. Cl.
*G06K 9/00* (2006.01)
*G06K 9/22* (2006.01)
*G06K 9/62* (2006.01)

(52) U.S. Cl.
CPC ..... *G06K 9/00154* (2013.01); *G06K 9/00161* (2013.01); *G06K 9/00181* (2013.01);
(Continued)

(58) Field of Classification Search
None
See application file for complete search history.

(56) References Cited

U.S. PATENT DOCUMENTS

| 4,453,267 A | 6/1984 | Paganini |
| 4,495,644 A | 1/1985 | Parks |

(Continued)

FOREIGN PATENT DOCUMENTS

| CN | 1445654 A | 10/2003 |
| DE | 69231818 T2 | 11/2001 |

(Continued)

OTHER PUBLICATIONS

Communication Pursuant to Article 94(3) EPC mailed Mar. 14, 2016, issued in corresponding Application No. EP 14193143.6, 4 pages.

(Continued)

*Primary Examiner* — Hadi Akhavannik
(74) *Attorney, Agent, or Firm* — Christensen O'Connor Johnson Kindness PLLC

(57) ABSTRACT

Handwriting verification methods and related computer systems, and handwriting-based user authentication methods and related computer systems are disclosed. A handwriting verification method comprises obtaining a handwriting test sample containing a plurality of available parameters, extracting geometric parameters, deriving geometric features comprising an x-position value and a y-position value for each of a plurality of feature points in the test sample, performing feature matching between geometric features of the test sample and a reference sample, determining a handwriting verification result based at least in part on the feature matching, and outputting the handwriting verification result. The geometric features may further comprise values derived from the geometric parameters, such as direction and curvature values. The handwriting verification result can be further based on a count of unlinked feature points. Handwriting-based user authentication methods can
(Continued)

employ such handwriting verification methods, or other handwriting verification methods.

34 Claims, 28 Drawing Sheets

(52) U.S. Cl.
CPC ......... *G06K 9/00865* (2013.01); *G06K 9/222* (2013.01); *G06K 9/6206* (2013.01)

(56) References Cited

U.S. PATENT DOCUMENTS

| | | | |
|---|---|---|---|
| 4,656,662 A | 4/1987 | Filliman | |
| 4,701,960 A | 10/1987 | Scott | |
| 4,724,542 A | 2/1988 | Williford | |
| 5,027,414 A | 6/1991 | Hilton | |
| 5,038,392 A | 8/1991 | Morris | |
| 5,054,088 A | 10/1991 | Gunderson | |
| 5,091,975 A | 2/1992 | Berger | |
| 5,101,437 A | 3/1992 | Plamondon | |
| 5,109,426 A | 4/1992 | Parks | |
| 5,111,512 A | 5/1992 | Fan | |
| 5,285,506 A | 2/1994 | Crooks | |
| 5,434,928 A | 7/1995 | Wagner | |
| 5,454,046 A | 9/1995 | Carman, II | |
| 5,528,003 A | 6/1996 | Bodin | |
| 5,528,699 A | 6/1996 | Obata | |
| 5,544,255 A | 8/1996 | Smithies | |
| 5,559,897 A | 9/1996 | Brown | |
| 5,577,135 A | 11/1996 | Grajski | |
| 5,644,655 A | 7/1997 | Windsor | |
| 5,647,017 A | 7/1997 | Smithies | |
| 5,657,396 A | 8/1997 | Rudolph | |
| 5,680,470 A | 10/1997 | Moussa | |
| 5,687,254 A | 11/1997 | Poon | |
| 5,699,445 A | 12/1997 | Wagner | |
| 5,818,955 A | 10/1998 | Smithies | |
| 5,828,772 A | 10/1998 | Kashi | |
| 5,892,824 A | 4/1999 | Beatson | |
| 5,933,514 A | 8/1999 | Ostrem | |
| 6,011,873 A | 1/2000 | Desai | |
| 6,055,592 A | 4/2000 | Smith | |
| 6,064,751 A | 5/2000 | Smithies | |
| 6,091,835 A | 7/2000 | Smithies | |
| 6,128,409 A | 10/2000 | Lewis | |
| 6,148,093 A | 11/2000 | McConnell | |
| 6,212,295 B1 | 4/2001 | Ostrem | |
| 6,307,955 B1* | 10/2001 | Zank | G06K 9/00154 380/30 |
| 6,381,344 B1 | 4/2002 | Smithies | |
| 6,487,310 B1 | 11/2002 | Bishop | |
| 6,512,840 B1 | 1/2003 | Tognazzini | |
| 6,661,908 B1 | 12/2003 | Suchard | |
| 6,694,045 B2 | 2/2004 | Chung | |
| 6,741,749 B2 | 5/2004 | Herbert, Jr. | |
| 6,970,581 B2 | 11/2005 | Yoshii | |
| 7,106,888 B1 | 9/2006 | Silverbrook | |
| 7,116,804 B2 | 10/2006 | Murase | |
| 7,139,431 B2 | 11/2006 | Silverbrook | |
| 7,190,815 B2 | 3/2007 | Zank | |
| 7,197,167 B2 | 3/2007 | Chung | |
| 7,206,436 B2 | 4/2007 | Murase | |
| 7,239,727 B2 | 7/2007 | Taylor | |
| 7,263,211 B2 | 8/2007 | Yoshii | |
| 7,362,901 B2 | 4/2008 | Walch | |
| 7,391,906 B2 | 6/2008 | Blake | |
| 7,426,288 B2 | 9/2008 | Sakamoto | |
| 7,433,499 B2 | 10/2008 | Kim | |
| 7,436,989 B2 | 10/2008 | Chung | |
| 7,474,770 B2 | 1/2009 | Beigi | |
| 7,506,153 B2 | 3/2009 | Lapstun | |
| 7,529,391 B2 | 5/2009 | Lin | |
| 7,545,959 B2 | 6/2009 | Houle | |
| 7,609,415 B2 | 10/2009 | Miki | |
| 7,693,312 B2 | 4/2010 | Zank | |
| 7,889,889 B2 | 2/2011 | Haid | |
| 7,916,906 B2 | 3/2011 | Hicks | |
| 7,917,761 B2 | 3/2011 | Cahill | |
| 7,933,840 B2 | 4/2011 | Zank | |
| 7,961,175 B2 | 6/2011 | Lapstun | |
| 7,973,775 B2 | 7/2011 | Lapstun | |
| 7,982,722 B2 | 7/2011 | Lapstun | |
| 7,983,455 B2 | 7/2011 | Moise | |
| 7,986,312 B2 | 7/2011 | Lapstun | |
| 8,090,161 B2 | 1/2012 | Kaplan | |
| 8,370,632 B2 | 2/2013 | Lehwany | |
| 2002/0106114 A1 | 8/2002 | Yan | |
| 2003/0182585 A1 | 9/2003 | Murase | |
| 2005/0105781 A1* | 5/2005 | Sakamoto | G06K 9/00154 382/119 |
| 2005/0175222 A1 | 8/2005 | Silverbrook | |
| 2006/0074814 A1* | 4/2006 | Lovell | G06Q 20/3674 705/67 |
| 2006/0136731 A1 | 6/2006 | Hicks | |
| 2006/0138228 A1 | 6/2006 | Sanders | |
| 2007/0065021 A1 | 3/2007 | Delgrosso | |
| 2007/0154071 A1* | 7/2007 | Lin | G06K 9/00181 382/119 |
| 2008/0019575 A1 | 1/2008 | Scalise | |
| 2008/0082426 A1 | 4/2008 | Gokturk | |
| 2010/0283766 A1 | 11/2010 | Shieh | |
| 2012/0206420 A1 | 8/2012 | Shieh | |
| 2012/0212459 A1 | 8/2012 | Rusu | |

FOREIGN PATENT DOCUMENTS

| | | |
|---|---|---|
| EP | 0099476 A2 | 2/1984 |
| EP | 0567680 B1 | 3/1993 |
| EP | 0 542 557 A2 | 5/1993 |
| EP | 0737342 A1 | 6/1995 |
| EP | 1020817 A1 | 7/2000 |
| JP | 58-178488 A | 10/1983 |
| JP | 62-006385 A | 1/1987 |
| JP | 05-268100 A | 10/1993 |
| JP | 05-274481 A | 10/1993 |
| JP | 06-162268 A | 6/1994 |
| JP | 10-187969 A | 7/1998 |
| JP | 10-240866 A | 9/1998 |
| JP | 2000-163514 A | 6/2000 |
| JP | 2003-271966 A | 9/2003 |
| WO | 2013/093864 A1 | 6/2013 |

OTHER PUBLICATIONS

Ismail, M.A., and S. Gad, "Off-Line Arabic Signature Recognition and Verification," Pattern Recognition 33(10):1727-1740, Oct. 2000.

Das, M.T., and L.C. Dulgar, "Signature Verification (SV) Toolbox: Application of PSO-NN," Engineering Applications of Artificial Intelligence 22(4-5):688-694, Jun. 2009.

Extended European Search Report mailed Apr. 13, 2015, issued in corresponding Application No. EP 14 19 3143.6, 9 pages.

Fahmy, M.M.M., "Online Handwritten Signature Verification System Based on DWT Features Extraction and Neural Network Classification," Ain Shams Engineering Journal 1(1):59-70, Sep. 2010.

Fierrez-Aguilar, J., et al., "An On-Line Signature Verification System Based on Fusion of Local and Global Information," Lecture Notes in Computer Science, vol. 3546, Audio- and Video-Based Bimetric Person Authentication, 2005, pp. 523-532.

Impedovo, D., and G. Pirlo, "Automatic Signature Verification: The State of the Art," IEEE Transactions on Systems, Man, and Cybernetics—Part C: Applications and Reviews 38(5):609-635, Sep. 2008.

Impedovo, D., et al., "Handwritten Signature Verification by Multiple Reference Sets," Proceedings of the 11th International Conference on Frontiers in Handwriting Recognition (ICFHR), Montréal, Aug. 19-21, 2008, 5 pages.

"Ink Serialized Format Specification," Microsoft Corporation, 2007, 49 pages.

(56) References Cited

OTHER PUBLICATIONS

International Search Report mailed Jan. 20, 2015, issued in corresponding International Application No. PCT/JP2014/005367, filed Oct. 22, 2014, 5 pages.
Jain, A.K, et al., "On-Line Signature Verification," Pattern Recognition 35(12):2963-2972, Dec. 2002.
Li, B., et al., "Minimizing Spatial Deformation Method for Online Signature Matching," in S.-W. Lee and S.Z. Li (eds.), "Advances in Biometrics: International Conference, ICB 2007, Seoul, Korea, Aug. 27-28, 2007, Proceedings," Springer, Berlin, Series: Lecture Notes in Computer Science 4642:646-652, Sep. 2007.
Luan, F., et al., "On-Line Handwritten Signature Verification Algorithm Based on Time Sequence," International Journal of Information and Systems Sciences 1(3-4):229-236,2005.
Martínez-Romo, J.C., et al., "On-Line Signature Verification Based on Genetic Optimization and Neural-Network-Driven Fuzzy Reasoning," in A.H. Aguirre et al. (eds.), "MICAI 2009: Advances in Artificial Intelligence: 8th Mexican International Conference on Artificial Intelligence, Guanajuato, México, Nov. 9-13, 2009, Proceedings," Springer, Berlin, Series: Lecture Notes in Computer Science/Artificial Intelligence 5845:246-257, Dec. 2009.
Muramatsu, D., and T. Matsumoto, "Effectiveness of Pen Pressure, Azimuth, and Altitude Features for Online Signature Verification," Proceedings of the International Conference on Advances in Biometrics (ICB '07), Aug. 2007, pp. 503-512.
Scattolin, P., "Recognition of Handwritten Numerals Using Elastic Matching," Thesis, Department of Computer Science, Concordia University, Montréal, Nov. 1995, 22 pages.

"SDK Feature Comparison," Wacom Co., Ltd., Tokyo, Japan, <http://gsdt.wacom.eu/product/SDKComparison.pdf>, at least as early as Jun. 2013, 1 page.
"Signature Components API," Global Signature Development Team, Wacom Co., Ltd., Tokyo, Japan, <http://gsdt.wacom.eu/download/file/Signature-SDK/1.6/Signature-Components-API.pdf>, at least as early as Sep. 2013, 75 pages.
Tappert, C.C., et al., "The State of the Art in On-Line Handwriting Recognition," IEEE Transaction on Pattern Analysis and Machine Intelligence (12)8:786-808, Aug. 1990.
Thumwarin, P., et al., "On-Line Signature Verification Based on FIR System Characterizing Motion Pressure," Proceedings of the 10th International ACM SIGGRAPH Conference on Virtual Reality Continuum and Its Applications in Industry (VRCAI 2011), Hong Kong, Dec. 11-12, 2011, pp. 565-568.
"Wacom SDKs: Integrate Signature Pads Into Your Workflow," © 2013 Wacom Europe GmbH, <http://signature.wacom.eu/software/software-development-kits-sdks>, at least as early as Dec. 2013, 2 pages.
Yuen, H., "A Chain Coding Approach for Real-Time Recognition of On-Line Handwritten Characters," Proceedings of the International Conference on Acoustics, Speech, and Signal Processing (ICASSP '96), Atlanta, Georgia, May 7-10, 1996, vol. 6, pp. 3426-3429.
Zimmerman, T.G., et al., "Retail Applications of Signature Verification," vol. 5404, Proceedings of SPIE, Biometric Technology for Human Identification, Aug. 2004, 9 pages.

\* cited by examiner

```
typedef struct EXAMPLE_DATA_SET
{
int    position_x;   // x point data
int    position_y;   // y point data
short  force;        // force data
short  height;       // z height data
int    Ti            // timestamp of this point [msec]
uchar  angle;        // theta or phi data
} EXAMPLE_DATA_SET
```
210

1st data_set    2nd data_set           Nth data_set
(X, Y, force, height, Time. ) (X, Y, force, height, Time. ) ..... (X, Y data
                                                                  sequence
                                                                  order
212

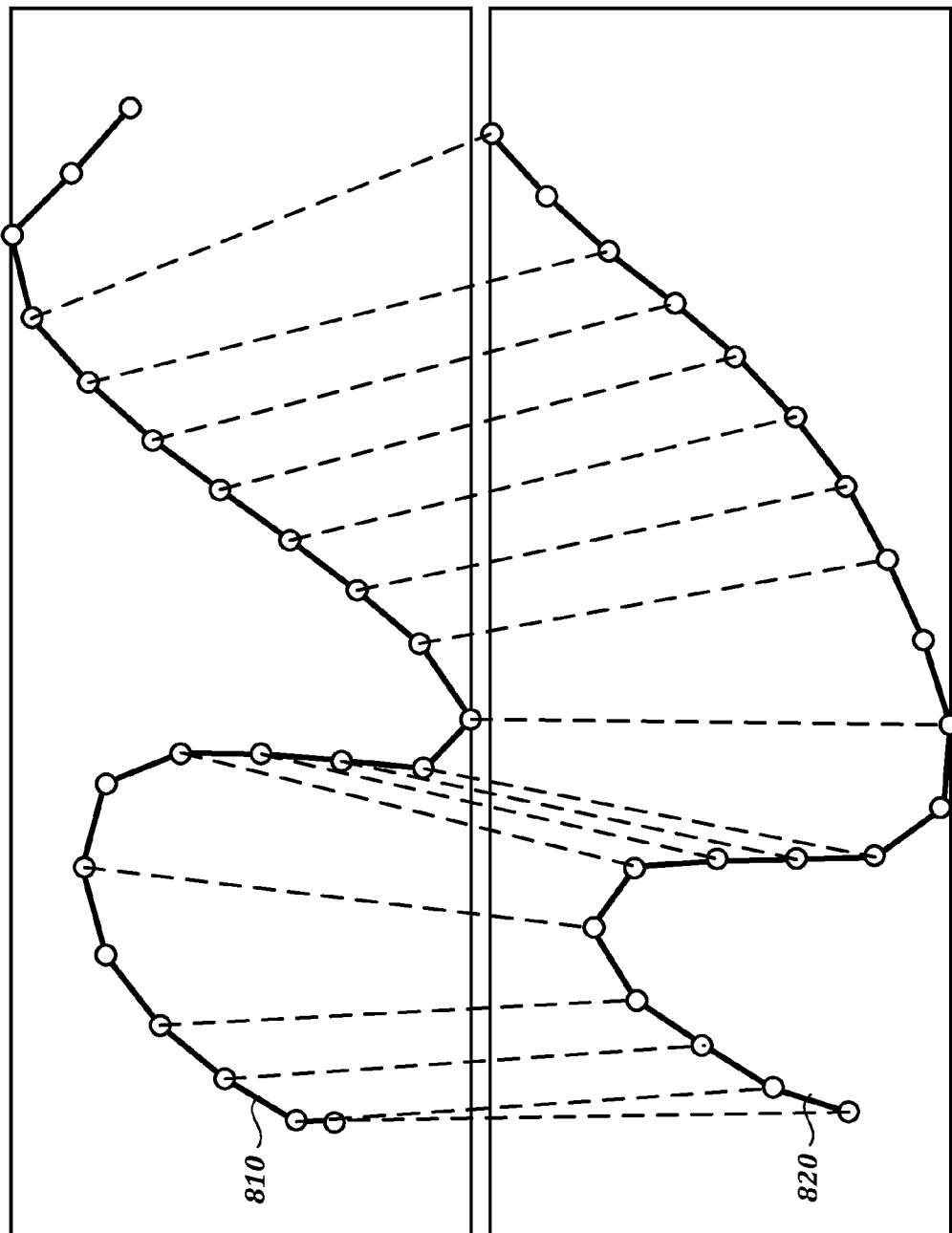

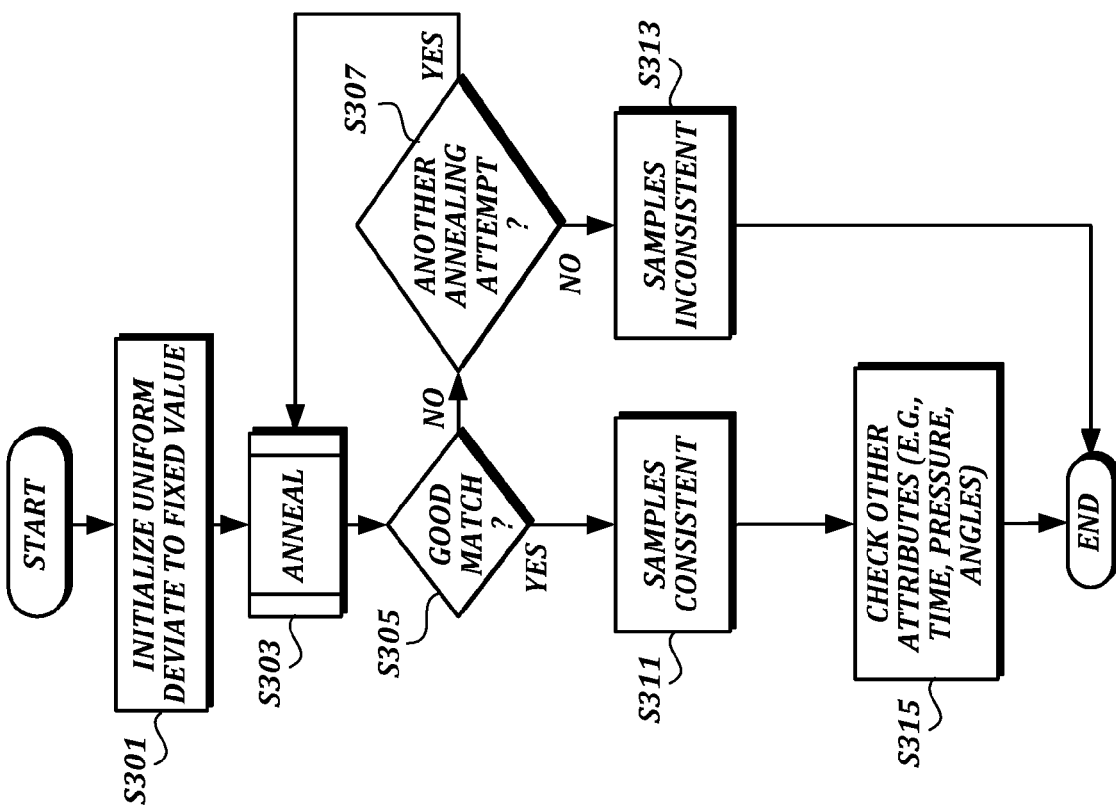

*FIG.16.*

| SERVICE ID | USER ID | REFERENCE SIGNATURE(S) |
|---|---|---|
| ABC | #0 | J. Smith |
| | #1 | J. Smith |
| | ... | W. Mayo |
| XYZ | #0 | 九田 不忍郎 |
| | ... | 九田 不忍郎 |

1690

| REFERENCE SIGNATURE(S) | NAME ID | |
|---|---|---|
| | LOCAL ID | SERVICE ID |
| J. Smith | #0 | ABC |
| J. Smith | #1 | ABC |
| W. Mayo | ... | ... |
| 山田 太郎 | #0 | XYZ |
| 山田 太郎 | ... | ... |

| STYLUS ID | NAME ID | | |
|---|---|---|---|
| | SERVICE ID | LOCAL ID | |
| #0 | ABC | #1 | |
| #1 | ABC | #N | |
| | XYZ | #2 | |
| ... | ... | ... | |
| ... | ... | ... | |
| #N | ABC | #0 | |
| ... | ... | ... | |

| (i) PEN/ DEVICE ID | (ii) TEST SIGNATURE (TO BE VERIFIED) | (iii) SERVICE ID | AUTHENTICATION INFORMATION (E.G. USERNAME:PASSWORD) |
|---|---|---|---|
| #0 | W. Hayes | ABC | ABCWhayes:pass123 |
| #1 | J. Smith | ABC | ABCJsmith:pass123 |
|  |  | XYZ | XYZJsmith:pass123 |
| ... | ... | ... | ... |
| #N | *signature* | Book+ | sammy123:pass!bookP |
| ... | ... | ... | ... |

*INPUT* (columns i–iii); *RETURN* (authentication information)

DYNAMIC HANDWRITING VERIFICATION AND HANDWRITING-BASED USER AUTHENTICATION

CROSS-REFERENCE TO RELATED APPLICATION

This application is a continuation of U.S. application Ser. No. 14/080,723, filed Nov. 14, 2013, which is expressly incorporated herein by reference in its entirety.

BACKGROUND

Electronic handwriting is increasingly important in a variety of contexts. For example, electronic handwriting is now commonly used in place of pen and paper to obtain a credit card holder's affirmation of a credit card transaction. As electronic handwriting has become more common, the ability to verify authenticity of electronic handwriting has also become more important.

U.S. Pat. No. 6,487,310 describes an "elastic matching" method for comparing one signature against another, comprising the operations of creating a mapping between corresponding points in two signatures to be compared measured at different times after the commencement of writing the signatures which maximizes the correlation between the local spatial neighborhood of the measured points and simultaneously minimizes the curvature of the elastic spatial distortion from the mapping, providing quantitative measures of both the degree of the spatial correlations and the degree of the non-uniform spatial distortions in the mapping, thereby providing measures of the similarity between the signatures.

Whatever the benefits of prior handwriting verification techniques, they do not have the advantages of the techniques and tools described below.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In at least one aspect of the present disclosure, a handwriting verification method comprises obtaining a handwriting test sample containing a plurality of available parameters, wherein the plurality of available parameters comprises geometric parameters and one or more non-geometric parameters; extracting the geometric parameters from the plurality of available parameters; based on the geometric parameters, deriving geometric features comprising an x-position value and a y-position value for each of a plurality of evenly distributed feature points in the handwriting test sample; performing first feature matching between geometric features of the handwriting test sample and geometric features of a reference sample; determining a handwriting verification result based at least in part on the feature matching; and outputting the handwriting verification result. The geometric features may further comprise values derived from the geometric parameters, such as direction and curvature values. The determining of the handwriting verification result can be further based on a count of unlinked feature points.

The first feature matching can include finding mappings between one or more of the evenly distributed feature points in the test sample and one or more evenly distributed feature points in the reference sample. The first feature matching can include a simulated annealing process. The simulated annealing process can include selecting a feature point in the reference sample; generating a pseudo-random value; comparing the pseudo-random value with a constant; and based on the comparing, determining whether to remove a link from a selected point in the reference sample or define a new link between the selected feature point in the reference sample and a selected feature point in the test sample. The determining step can be biased towards defining a new link over removing an existing link based on the value of the constant. If a new link is defined, any previously existing links that are crossed by the new link can be removed.

Second feature matching also can be performed, which may include evaluation of a non-geometric parameter (e.g., a time-related parameter, such as speed or acceleration). The handwriting verification result can be further based on the second feature matching.

In another aspect, a handwriting verification method comprises performing feature matching between geometric features of a handwriting test sample and geometric features of a reference sample, wherein the feature matching comprises defining one or more links between one or more evenly distributed feature points in the test sample and one or more evenly distributed feature points in the reference sample; obtaining a count of consecutive unlinked feature points in the test sample; and outputting a handwriting verification result, wherein the handwriting verification result is based at least in part on the feature matching and the count of consecutive unlinked feature points in the test sample.

In another aspect, a user authentication method comprises receiving test signature data and a user device identifier (ID) from a user device; searching for a name ID associated with the test signature data; obtaining the name ID; searching for a reference device ID associated with the name ID; comparing the reference device ID with the user device ID; and providing authentication information (e.g., an authentication result) to the user device based on the comparing. The device IDs may be, for example, pen or stylus IDs associated with a pen or stylus.

In another aspect, a user authentication method comprises receiving test signature data (e.g., encrypted test signature data), a device identifier, and a service identifier from a user device, wherein the service identifier relates to a service executing on the user device; comparing the test signature data with reference signature data; based on a result of the comparing, obtaining authentication information (e.g., a user ID and a password) associated with the service executing on the user device; and providing the authentication information to the user device. If the test signature data is consistent with the reference signature data, the test signature data may be added to the reference signature data (e.g., as supplemental information for future authentications).

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is diagram of mappings established between a test sample and a reference sample by a feature matching technique;

FIG. 9E is a flow chart of an example process by which annealing can be repeated in a handwriting verification process;

FIG. 16 is an illustration of a table that can be used to look up a reference signature based on one or more identifiers;

FIG. 18A is an illustration of a table that can be used to look up an identifier based on signature data;

FIG. 18B is an illustration of a table that can be used to look up a device identifier based on other identifiers;

FIG. 19B is an illustration of a table of data that can be used in the user authentication process shown in FIG. 19A.

DETAILED DESCRIPTION

Figure 1A:
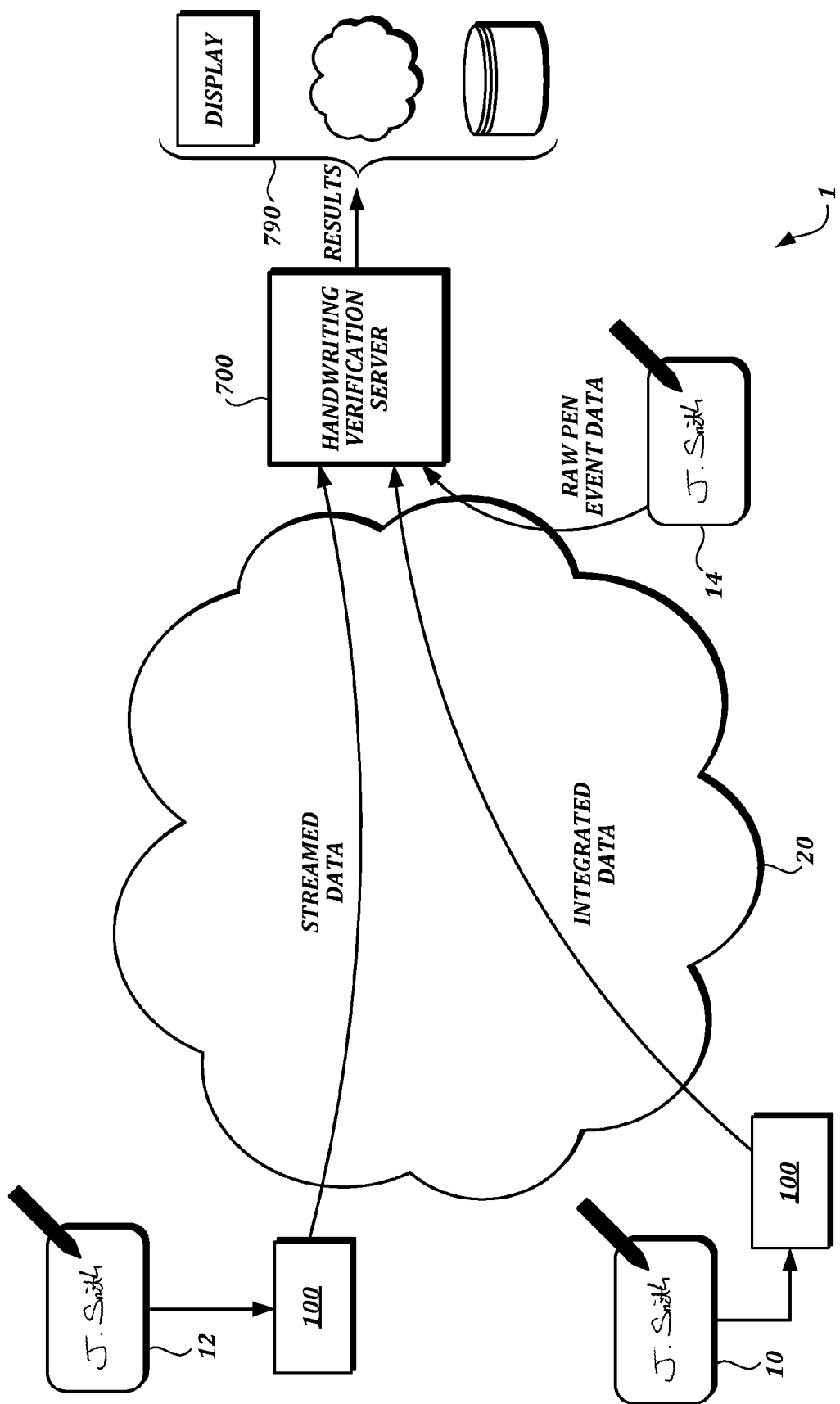
FIG. 1A is a high-level diagram of an illustrative cloud computing arrangement configured to verify authenticity of sample handwriting data.

The present disclosure is generally directed to techniques and tools for verifying electronic signatures or other electronic handwriting.

Determining whether a signature is authentic poses many challenges. One challenge is that authentic signatures made by the same person will always have some degree of variability. Another challenge is that the degree of variability between authentic signatures will vary from person to person. Previously, a determination of the level of variability has been made by combining several reference samples collected at different times into a template that can be used for verification. However, collecting several reference samples at different times does not fit well with many business processes. For example, banks have traditionally stored a single reference signature for comparison purposes. Thus, the ability to improve the accuracy of a verification process while using a single reference would be advantageous.

Accordingly, in described embodiments, a dynamic handwriting verification engine is configured to compare handwriting data associated with a handwriting test sample (e.g., a signature) with handwriting data associated with a reference sample to determine whether the test sample is authentic. Although some embodiments described herein refer to verification of signatures, it should be understood that embodiments described herein can be used to verify handwriting of all kinds, and are not limited to verification of signatures.

In accordance with embodiments described herein, a verification process involves matching geometric features in a test sample and a reference sample while allowing for minor differences resulting from natural inconsistency between samples that are made by the same person. In addition to geometric features, the verification process also can take into account more data that can be generated by current handwriting collection technology (e.g., movement of a pen between strokes, pen pressure, pen angles, and the like), which can improve the quality of verification results. Because different input devices may provide different types of data, the verification process can adapt to the types of data provided by particular devices, in accordance with embodiments described herein. For example, if a test sample includes pressure information and a reference sample does not, the verification process can omit analysis of pressure information and focus instead on comparisons of data that are common to the two samples.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

FIG. 1A is a high-level diagram of an illustrative cloud computing arrangement 1 configured to verify authenticity of sample handwriting data in accordance with techniques described herein. In the example shown in FIG. 1A, handwriting input devices 10, 12, and 14 provide handwriting data in various forms to a handwriting verification server 700 over a network 20 (e.g., the Internet). The handwriting input devices 10, 12, and 14 may be implemented as dedicated handwriting collection devices or as general purpose devices, such as suitably configured smart phones or tablet computers. Although the handwriting input devices 10, 12, and 14 are referred to herein as "input devices," such devices are not limited to the collection of input and typically will also include other functionality (e.g., display functionality, data transmission functionality, etc.).

When a handwritten signature is made on paper, an ink pen leaves a continuous trail of ink that forms the signature. A digital version of a handwritten signature generally comprises a collection of discrete data points measured at regular time intervals.

Referring again to FIG. 1A, any of the input devices 10, 12, 14 may use electromagnetic resonance (EMR) technology, in which a digitizer incorporates a sensor board that detects the pen's movement and energy is induced in the pen's resonant circuit by a magnetic field generated by the sensor board surface. The pen's resonant circuit then makes use of this energy to return a magnetic signal to the sensor board surface. The board detects the pen's coordinate position at regular time intervals even if the electronic pen does not touch the sensor board surface, so long as the pen remains within close enough proximity to the sensor board, such that signals can still be received from the pen. (The effective signal range can vary depending on the particular technology being used, but is generally on the order of several millimeters.)

Alternatively, other handwriting input technology can be used. For example, an electronic pen may use other wireless technology or may be connected by a wire to a digitizer. As another example, an electronic pen may or may not be detectable away from the surface of a digitizer. As another example, an electronic pen may be powered or unpowered. Powered pens may receive power via a wire connected to an external power source or via an on-board battery. As another example, it is possible to input handwriting data without an electronic pen (e.g., via a stylus on a pressure sensitive digital writing pad, a touchscreen, or some other input device that does not require an electronic pen).

However the handwriting data may be collected, handwriting data provided by the input devices 10, 12, and 14 may include pen event information, device information, and/or contextual information about the context in which the handwriting was made. In described embodiments, pen event information includes the x, y position of the pen-tip on or above the digitizer surface and the time since the start of the handwriting. Further, pen event information may optionally include additional information subject to the capabilities of the input devices 10, 12, and 14, such as pressure (pen force), angles (azimuth, altitude, and/or rotation) and pen-down status. Pen event information is typically collected at regular intervals during a signing process.

Device information may include information needed to convert from digitizer units to real-world units. Contextual information for a signature may include the name of the person signing; the date and time of signature; the reason for signing; the type and version of operating system used on a host device; the type of digitizer; the version of the digitizer device driver; a unique identifier taken from the network interface controller (NIC) address of the a host device; if a cryptographic hash function is used, information about the type of hash function; and/or supplementary data that may be added by a software application at the time of capture. Contextual information also may include information about the document being signed, such as a cryptographic message digest.

Referring again to FIG. 1A, the handwriting verification server 700 performs a verification process that compares handwriting test samples with reference samples to determine whether the test samples are authentic. Results of the verification process can be output by the handwriting verification server 700. In at least one embodiment, the handwriting verification server 700 performs the verification process illustrated in FIG. 4, as described in further detail below. In the example shown in FIG. 1A, results of the verification process are provided by the handwriting verification server to a post-processing section 790 for further processing (e.g., formatting results for display, storing results, analyzing results, transmitting results to other devices, etc.). The post-processing section 790 may be implemented in the handwriting verification server 700 and/or in one or more other devices.

The handwriting verification server 700 can verify the authenticity of handwriting input data provided in various forms (e.g., integrated data, streamed data, raw pen event data). For example, as shown in FIG. 1A, the input devices 10 and 12 can transmit raw handwriting data to a handwriting data processing section 100, which can generate and transmit streamed data or integrated data to the handwriting verification server 700 over the network 20, as described in further detail below.

Figure 1B:
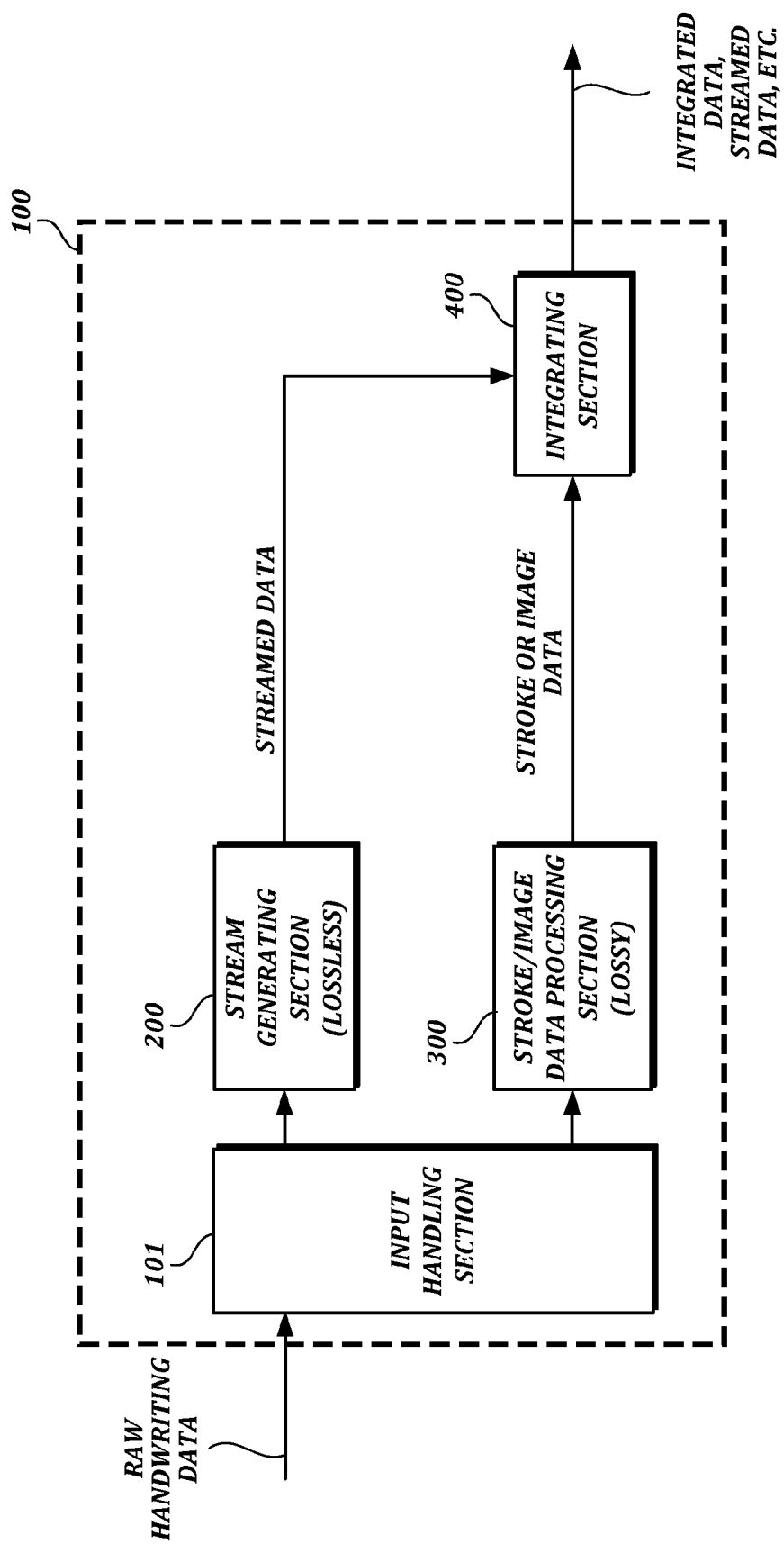
FIG. 1B is a functional block diagram of an illustrative handwriting data processing section.

FIG. 1B is a functional block diagram of an illustrative handwriting data processing section 100. The handwriting data processing section 100 may be implemented (e.g., as software or hardware) within a handwriting input device or in some other device that may communicate with the input device directly (e.g., via a USB connection) or over a network.

In the example shown in FIG. 1B, the handwriting data processing section 100 comprises an input handling section 101, a stream generating section 200, a lossy data processing section 300, and an integrating section 400. The input handling section 101 is responsible for forwarding raw handwriting data for further processing by, e.g., the stream generating section 200 and the lossy data processing section 300. The stream generating section 200 receives raw handwriting data as input and generates streamed data (e.g., separate streams for x-coordinate, y-coordinate, and pressure information, along with header information). In at least one embodiment, the stream generating section 200 uses lossless encoding techniques to generate compressed streamed data comprising a plurality of streams.

In the example shown in FIG. 1B, the lossy data processing section 300 also receives raw handwriting data as input. The lossy data processing section 300 can use lossy data processing techniques (that is, techniques that may involve data loss) to generate stroke data (which can be used to render the handwriting as an image) and/or image data (e.g., image data in a PNG format or some other image data format). For example, the lossy data processing section 300 may include an ink engine configured to perform data formatting and processing that may be needed to render a visual representation of the handwriting (e.g., a signature) for display. As an alternative to the arrangement shown in FIG. 1B, in which stroke data and/or image data is generated based on raw handwriting data, the lossy data processing section 300 can generate output based on streamed data provided by the stream generating section 200.

In the example shown in FIG. 1B, the integrating section 400 receives the streamed data and the stroke and/or image data as input and outputs integrated handwriting data. The integrating section 400 may output integrated data in a single output file (e.g., an image file) or it may separately output streamed data and/or stroke/image data. In at least one embodiment, streamed data can be converted into an encoded binary format, and the integrated data can take the form of a digital image with the encoded binary data inserted steganographically into the digital image.

The arrangements shown in FIGS. 1A and 1B are only examples. Many other arrangements are possible. For example, although handwriting input and handwriting verification are described with reference to FIG. 1A as occurring in different devices (e.g., in input devices and the handwriting verification server 700, respectively), handwriting input and handwriting verification also can be performed within the same device. As another example, although handwriting input devices and a handwriting verification server are described with reference to FIG. 1A as communicating within a cloud computing arrangement 1 over a wide-area network such as the Internet 20, input devices and the handwriting verification server also can communicate in some other way (e.g., over a local-area network). As another example, the details of how the handwriting data processing section 100 operates may vary depending on implementation and/or context. As another example, a handwriting data processing section 100 is not required for providing handwriting data to be verified according to the techniques described herein. In the example shown in FIG. 1A, input device 14 generates raw pen event data and transmits the raw pen event data over the network 20 to the handwriting verification server 700 without intermediate processing by a handwriting data processing section 100.

Figure 2B:
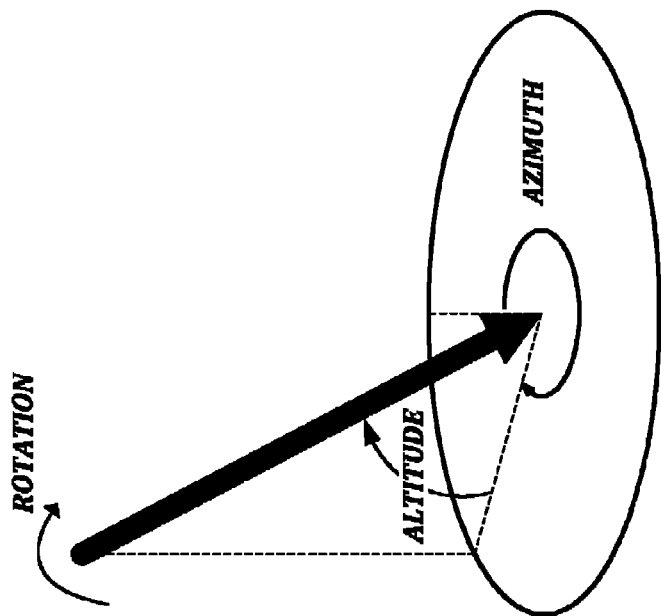
FIG. 2B is a diagram of rotation, altitude, and azimuth parameters that can be detected for a pen device.
Figure 2A:
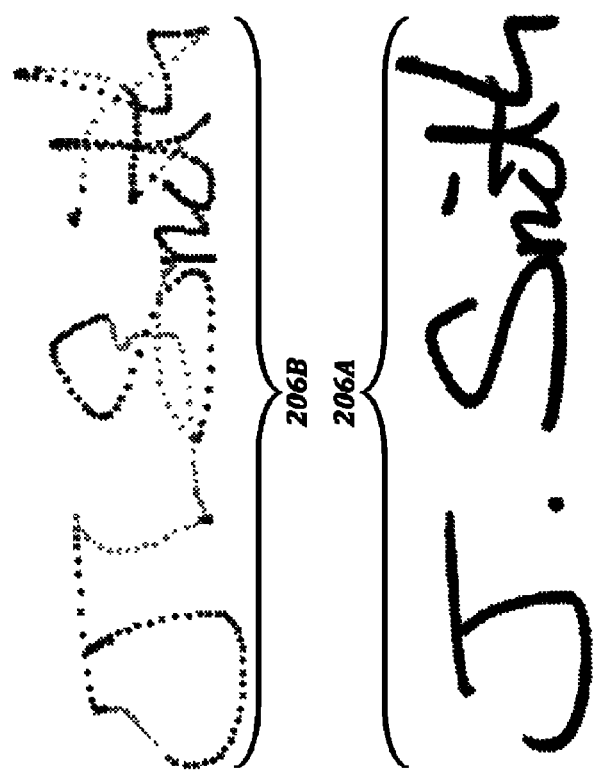
FIG. 2A is an illustration of a handwritten signature comprising a plurality of pen events.

In accordance with embodiments described herein, a handwriting sample to be verified (or "test sample") can be a handwritten signature (see FIG. 2A) or any other type of handwriting, such as printed characters or an artistic drawing.

In described embodiments, handwriting data can be represented as a sequence of pen events. Typically, a pen event records the position of the pen tip (e.g., while on the surface of or within a limited range of a digitizer) at a particular time. In addition to x/y-coordinate values, some handwriting input devices also may detect other information such as pen angle, writing speed, writing pressure, etc. Depending on device capabilities, pen data associated with pen events may include additional measurements such as pen pressure and angles. In the example shown in FIG. 2B, rotation, altitude, and azimuth are among the parameters that can be detected for a pen device (represented by a large black arrow 208).

Referring again to FIG. 2A, an illustrative handwritten signature 206A comprises a plurality of pen events are detected by a pen device and digitizer using technology (e.g., EMR technology) that allows pen events to continue to be detected when the pen is lifted from the surface of the digitizer, as long as the pen remains within signal range. In the example shown in FIG. 2A, coordinates detected when the pen is up are depicted as lighter dots, and coordinates detected while the pen is down are depicted as darker dots.

Figure 2C:
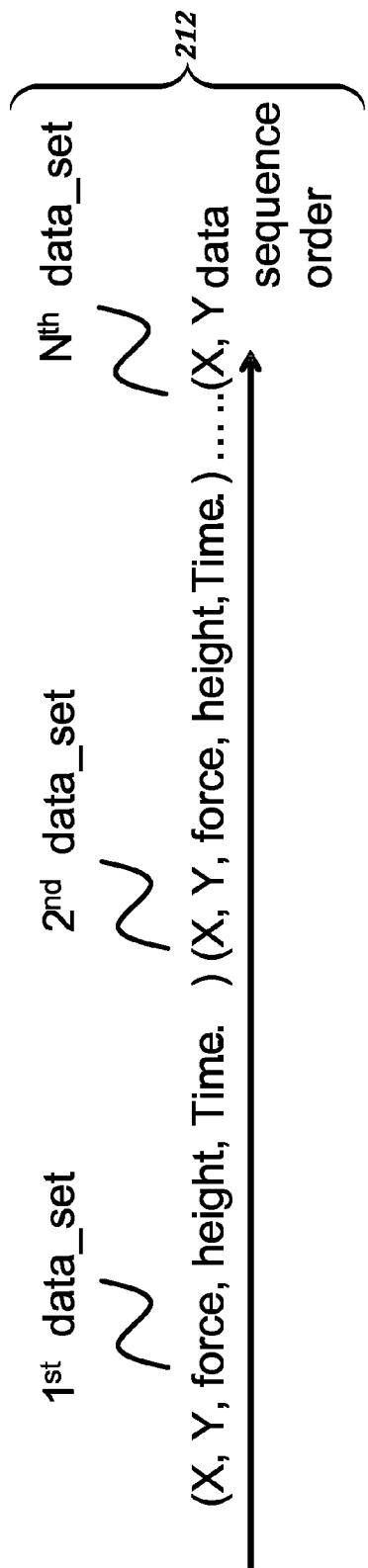
FIG. 2C is an illustration of an example data structure that can be used to represent a pen event and a data sequence order of such pen events.

FIG. 2C is an illustration of an example data structure 210 that can be used to represent a pen event and a data sequence order 212 of such pen events. A sequence of pen events can be provided as input to, for example, a handwriting verification server 700, either in a raw form and/or in a pre-processed form (e.g., via a handwriting data processing section 100, which may be used to put the pen event data into the form of streamed data and/or integrated data). In the example shown in FIG. 2C, the data structure 210 can be implemented as a "struct" or "class" type. Alternatively, the data structure 210 can be implemented in some other way. In described embodiments, pen events are provided in the order they occurred in the data sequence order 212.

Figure 3:
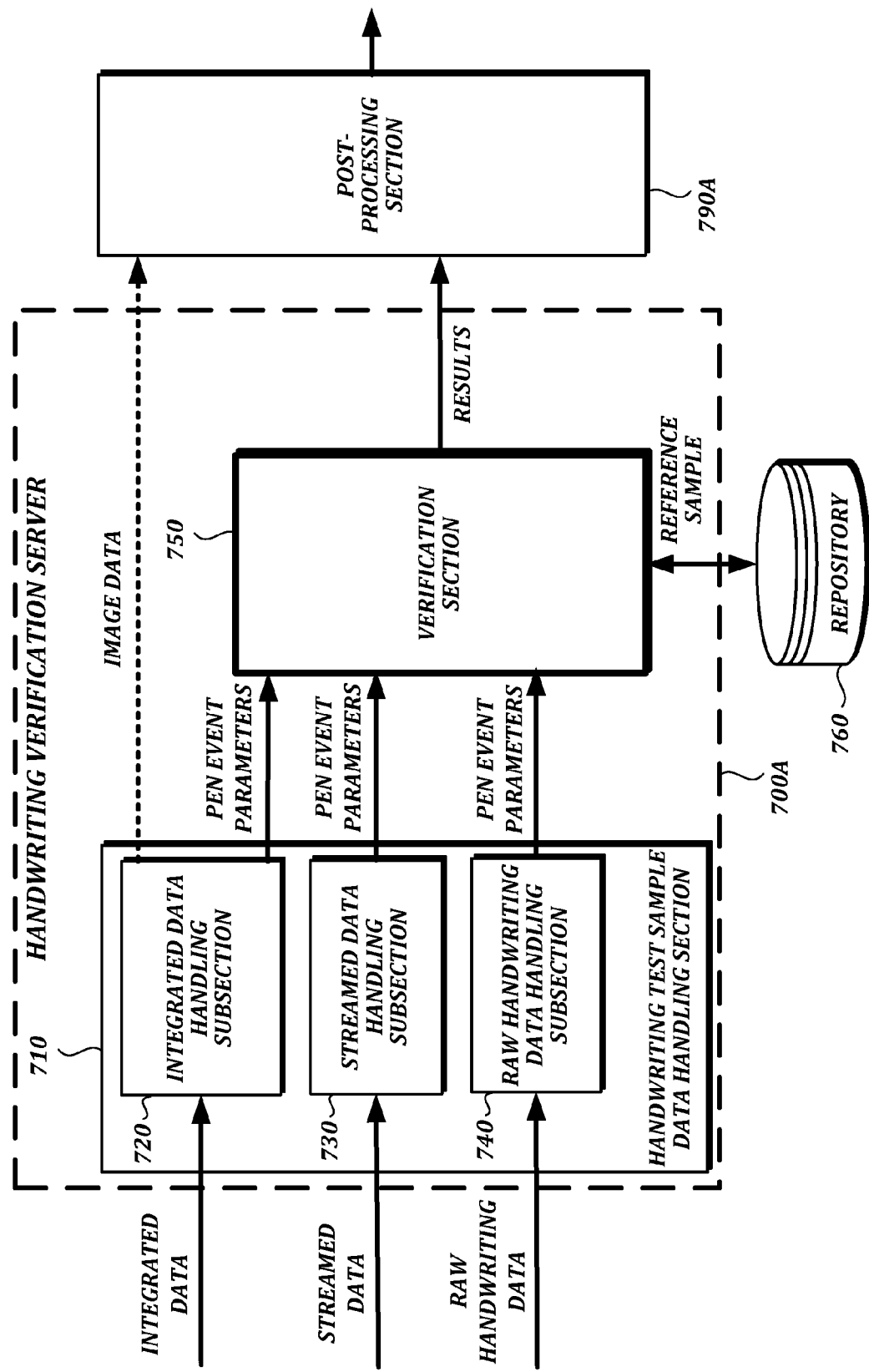
FIG. 3 is a functional block diagram of a handwriting verification service that may be implemented in a handwriting verification server.

FIG. 3 is a functional block diagram of a handwriting verification service 700A that may be implemented in a handwriting verification server (e.g., the handwriting verification server 700 shown in FIG. 1A). In the example shown in FIG. 3, the handwriting verification service 700A comprises a handwriting test sample data handling section 710 comprising subsections 720, 730, and 740 that are configured to process handwriting data in various forms. In the illustrated example, an integrated data handling subsection 720, a streamed data handling subsection 730, and a raw handwriting data subsection 740 are configured to receive integrated data, streamed data, and raw handwriting data, respectively, as input, and generate pen event parameters as output. Some of the data handling sections may be capable of outputting other data, as well. For example, in the example shown in FIG. 3, integrated data handling section 720 is configured to extract image data from the integrated data and transmit the image data to post-processing section 790A for further processing.

In the example shown in FIG. 3, a verification section 750 receives pen event parameters from the handwriting test sample data handling section 710 and receives a reference sample from a repository 760. (The repository 760 may be implemented on a device separate from the handwriting verification service 700A, as shown in FIG. 3, or the repository may be implemented on the same device as the service 700A.) The verification section 750 verifies the authenticity of a handwriting test sample by comparing features derived from the pen event parameters with features of the reference sample.

Figure 4:
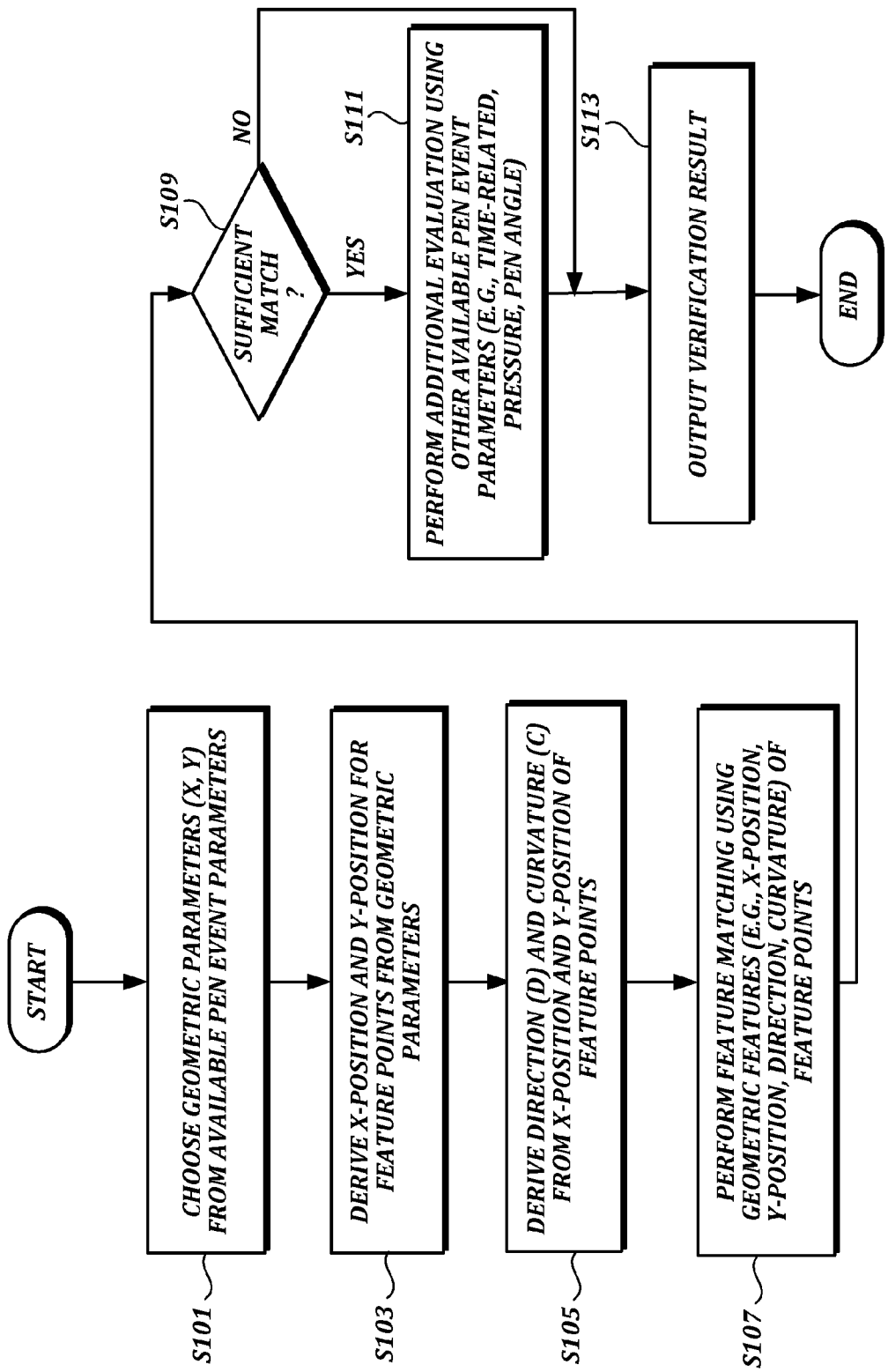
FIG. 4 is a flow chart of an example dynamic handwriting verification process.

An example dynamic handwriting verification process is shown in FIG. 4. The verification process shown in FIG. 4 can be performed by a handwriting verification server (e.g., handwriting verification server 700 in FIG. 1A) or by some other device. The verification process shown in FIG. 4 can be performed in a cloud computing arrangement (e.g., cloud computing arrangement 1 shown FIG. 1A) or in some other arrangement. In described embodiments, the verification process uses geometric parameters of the handwriting in a handwriting test sample to derive handwriting features that can be compared with features in a reference sample.

In the example shown in FIG. 4, geometric parameters of the handwriting are chosen from available pen event parameters at step S101. In this example, geometric parameters of the handwriting include x-coordinate values and y-coordinate values. The available pen event parameters from which the geometric parameters are chosen may include, in addition to the x-coordinate values and y-coordinate values, pressure values, angle values, time stamp information, or the like. The available pen event parameters may depend on factors such as the capabilities of the input device that was used to create the handwriting.

Because the speed of ordinary handwriting varies, the detection of x-coordinate and y-coordinate positions at regular time intervals results in variable spacing between the detected positions. Referring again to the example signature shown in FIG. 2A, the coordinate positions 206B of the pen events are detected at regular intervals (e.g., at a sample rate of 133 points per second, 200 points per second, or some other sample rate). Therefore, greater spacing between the coordinate positions 206B indicates portions of the signature in which the pen is moving faster, and narrower spacing indicates portions in which the pen is moving slower.

Referring again to FIG. 4, in order to facilitate comparison of feature points in handwriting test samples and reference samples, feature points are derived from the geometric parameters of the handwriting at step S103. Feature points derived in this way follow the handwriting path of the sample but need not be co-located with pen events. In at least one embodiment, feature points are evenly distributed along the handwriting path. However, feature points can be distributed in other ways.

Figure 5:
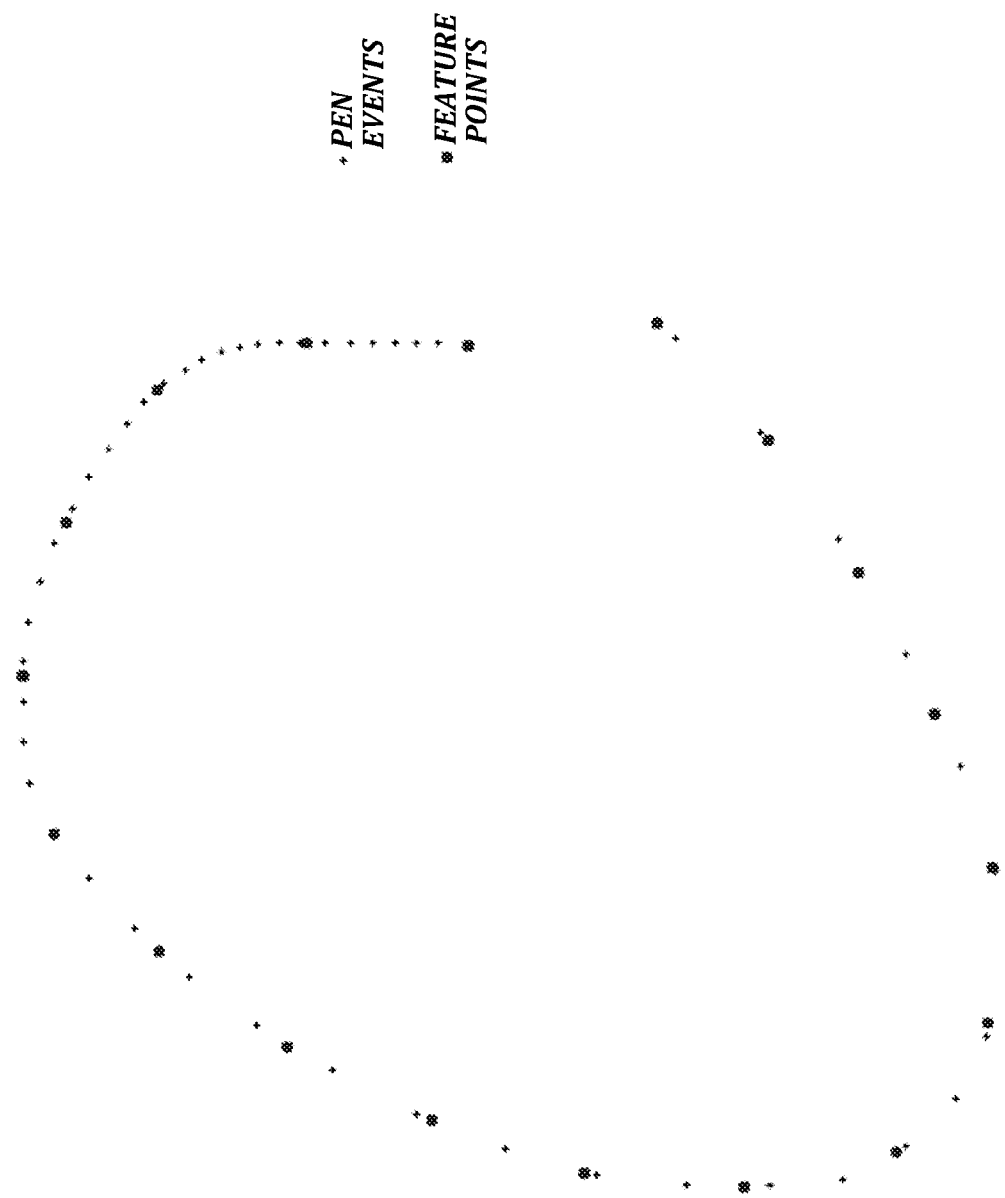
FIG. 5 is an illustration of feature points along a handwriting path.

FIG. 5 depicts illustrative spacing of feature points along a handwriting path. In the example shown in FIG. 5, the feature points are evenly distributed. In general, decreasing the spacing tends to increase the number of feature points, which can lead to increased processing time. On the other hand, increasing the spacing tends to decrease the number of feature points, which can lead to decreased accuracy and omission of important features in the handwriting. In at least one embodiment, a regular spacing of 1 mm is used as a compromise to balance reasonable processing time with accurate detection of important handwriting features.

The particular spacing that is used can vary depending on implementation. For example, the spacing between feature points need not be uniform. According to one alternative approach, feature points can be positioned according to a density normalization process in which the spacing between densely packed pen events is expanded for the corresponding feature points. In such an approach, feature points may or may not be co-located with original pen events. The density normalization process also can include inserting feature points into portions of the handwriting path where pen events are sparse. The density normalization process can be applied to the test sample and to the reference sample to resolve point density differences between the samples while still allowing for some variation in spacing between feature points, which can help to preserve information relating to speed and acceleration of handwriting. The density normalization process can help to provide comparable sets of feature points between samples obtained by devices with different sampling rates.

Referring again to FIG. 4, each of the feature points (see step S103) is associated with a corresponding x-position and y-position calculated at regular spatial intervals along the handwriting path. In at least one embodiment, the x-positions and the y-positions of the respective feature points are calculated as shown in FIG. 6.

Figure 6:
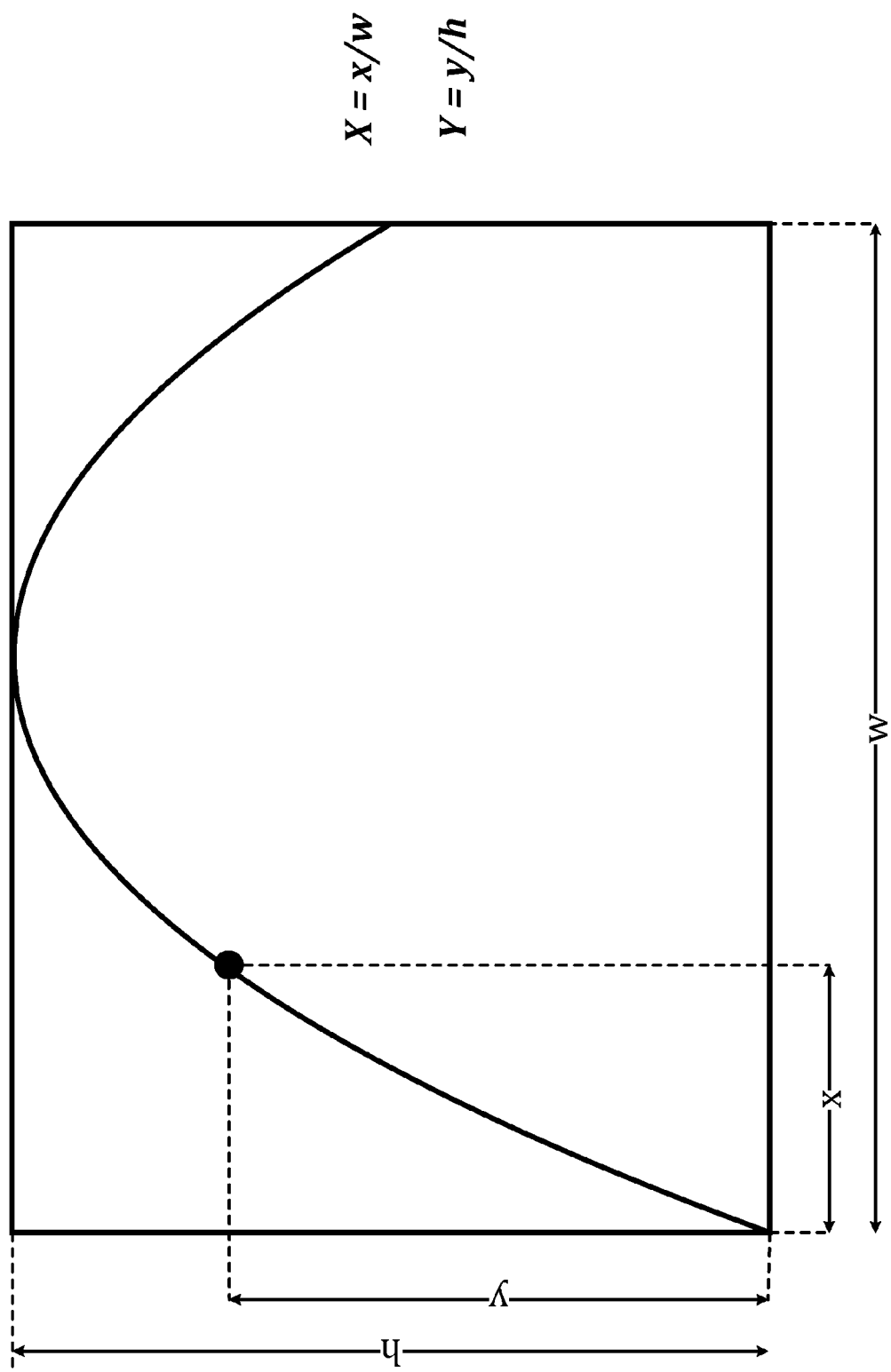
FIG. 6 is a graph that illustrates calculations of x-positions and y-positions of respective feature points.

In the example shown in FIG. 6, the x-position (X) and the y-position (Y) of the feature points are defined as the proportion of the x-coordinate value or y-coordinate value, respectively, relative to an overall value of the respective dimension (e.g., width (w) or height (h)) of the handwriting or some portion of the handwriting (e.g., a stroke).

In at least one embodiment, feature points are defined for the entire length of a handwriting sample, including pen-up areas in which the pen was not in contact with the tablet surface. In some circumstances, pen-up information will not be available between strokes. This can occur, for example, when a capture device is used that does not support pen-up data, or when a pen is held at a distance from the digitizer such that pen-up data cannot be detected. If pen-up information is not available, feature points can be generated within the limits of pen-down pen events.

Figure 7B:
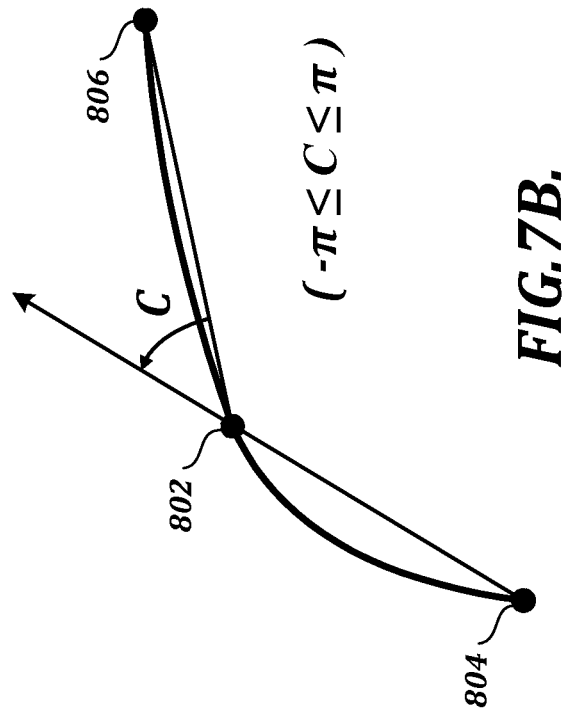
FIGS. 7A and 7B are illustrations that depict calculations of direction and curvature, respectively, for a current feature point based on x-positions and y-positions of previous feature points and subsequent feature points.

Referring again to FIG. 4, at step S105, direction (D) and curvature (C) are derived from x-positions and y-positions of the derived feature points. In this example, the direction and curvature values derived at step S105 are not based on x/y-coordinate values from the original pen events. In at least one embodiment, direction and curvature are derived for a current feature point based on x-positions and y-positions of previous feature points and subsequent feature points, as shown in FIGS. 7A and 7B.

Figure 7A:
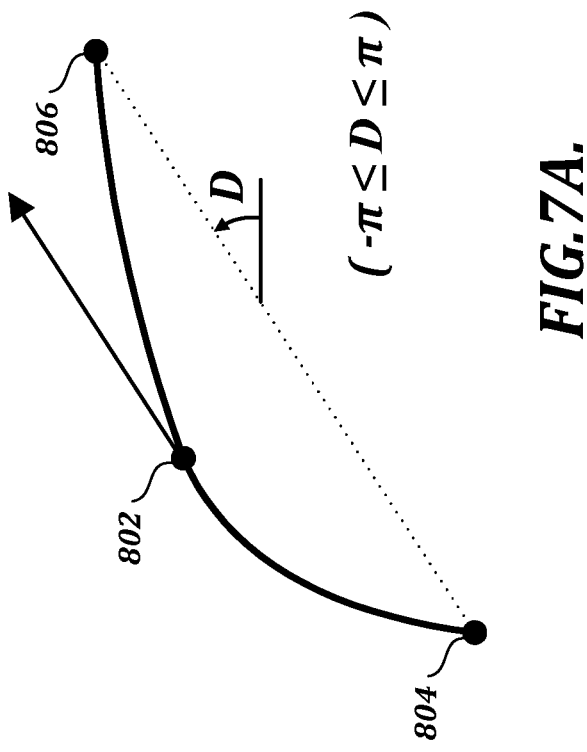

In the example shown in FIG. 7A, the direction D for a current feature point 802 is calculated as the angle (relative to the horizontal, in radians) of the line between the previous feature point 804 and the next feature point 806. In the example shown in FIG. 7B, the curvature C for a current feature point 802 is calculated as the angle (in radians) between the line that connects the current feature point 802 to the previous feature point 804 and the line that connects the current feature point 802 to the next feature point 806.

Referring again to FIG. 4, at step S107 feature matching is performed using geometric features (e.g., x-position, y-position, direction, curvature) of the feature points. In this example, the goal of the feature matching is to link corresponding geometric features in a handwriting sample to be verified (or test sample) and a reference sample while providing flexibility to account for natural variation in authentic handwriting. The feature matching of step S107 may include more than one feature matching pass, as described in further detail below.

FIG. 8 is an illustration of mappings established between a test sample 810 and a reference sample 820 by a feature matching technique (e.g., step S107 in FIG. 4). In the example illustrated in FIG. 8, the mappings comprise links (represented by dashed lines) established between corresponding feature points (represented by circles) in a test sample 810 and a reference sample 820. The consistency of the handwriting line at each end of the link can be referred to as the "energy" of the link. In this example, the energy is measured in terms of the differences between x-position (X), y-position (Y), direction (D), and curvature (C) values of the linked feature points.

In at least one embodiment, the energy is measured according to the following equation:

$$e_i = k_x(X_r - X_t)^2 + k_y(Y_r - Y_t)^2 + k_d(D_r - D_t)^2 + k_c(C_r - C_t)^2,$$

where $e_i$ is the energy of the $i^{th}$ link, connecting a reference sample r with a test sample t; $X_r$, $Y_r$, $D_r$, and $C_r$ are the x, y, direction and curvature values for the reference sample; $X_t$, $Y_t$, $D_t$, and G are the x, y, direction and curvature values for the test sample; and $k_x$, $k_y$, $k_d$, and $k_c$ are weighting factors for the different energy components.

In at least one embodiment, an optimal set of links is one that achieves a minimum total energy (E) of the system, which can be defined according to the following equation:

$$E = \Sigma e_i + k_u n_u,$$

where $e_i$ is the energy of the $i^{th}$ link; $k_u$ is a constant representing the energy of an unlinked feature; and $n_u$ is the number of unlinked features (if any).

In at least one embodiment, numerical annealing is used to minimize the differences between the feature points at the ends of each link, and thereby minimize the energy E. In particular, in at least one embodiment, a method of simulated annealing is used to make pseudo-random changes to the link, which may increase or decrease the overall energy.

In one example annealing process, which is now described with reference to FIGS. 9A-9D, changes that result in a reduction of the overall energy are always accepted, and changes that result in energy increases may be accepted depending on factors such as the current temperature of the system, which may be progressively reduced. The term "temperature" as used herein refers to the mathematical energy of the system and does not refer to any actual thermal energy. Similarly, related terms such as "cooling" are used to refer to reduction of the mathematical energy, and do not refer to any change in actual thermal energy.

"Energy" and "temperature" are related terms that can be used to model the annealing process. In at least one embodiment, a goal of the annealing process is to find the best set of links between corresponding features in two signatures. The relative merit of any of the possible linking patterns can be determined by assessing the similarity of the geometric features such as position, line direction and curvature at linked feature points. The energy of a link is a measure of the differences between the two feature points. Zero energy indicates a state of having identical features, and the energy increases as the differences become more substantial.

The annealing process tries to minimize the total energy of the system by adjusting the set of links. However, if individual adjustments that increase the total energy were never permitted, the probability of the annealing process becoming trapped in a local minimum of total energy would increase. To address this situation, the annealing process can be designed to reduce the probability of the process becoming trapped in a local minimum by allowing some changes that result in an increase in energy, thereby allowing for the possibility that subsequent changes may achieve lower total energy.

The temperature of the system can be used to control the likelihood of a change that increases the total energy. In at least one embodiment, the temperature is initially set at a relatively high value that allows increases in energy to occur more frequently. The temperature is reduced as the annealing process proceeds. As the temperature drops, the likelihood of increased energy is reduced until stability in the system is reached.

Figure 9A:
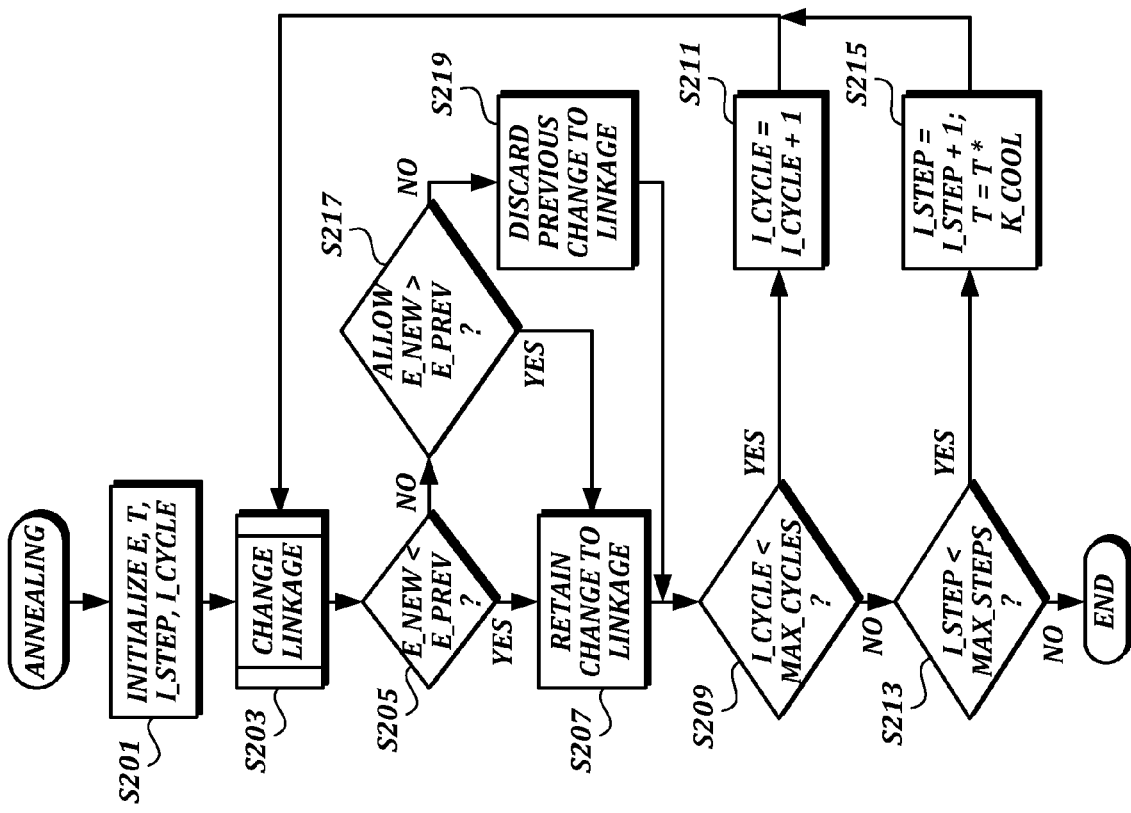
FIG. 9A is a flow chart of an example annealing process that can be used in a handwriting verification process.
Figure 9B:
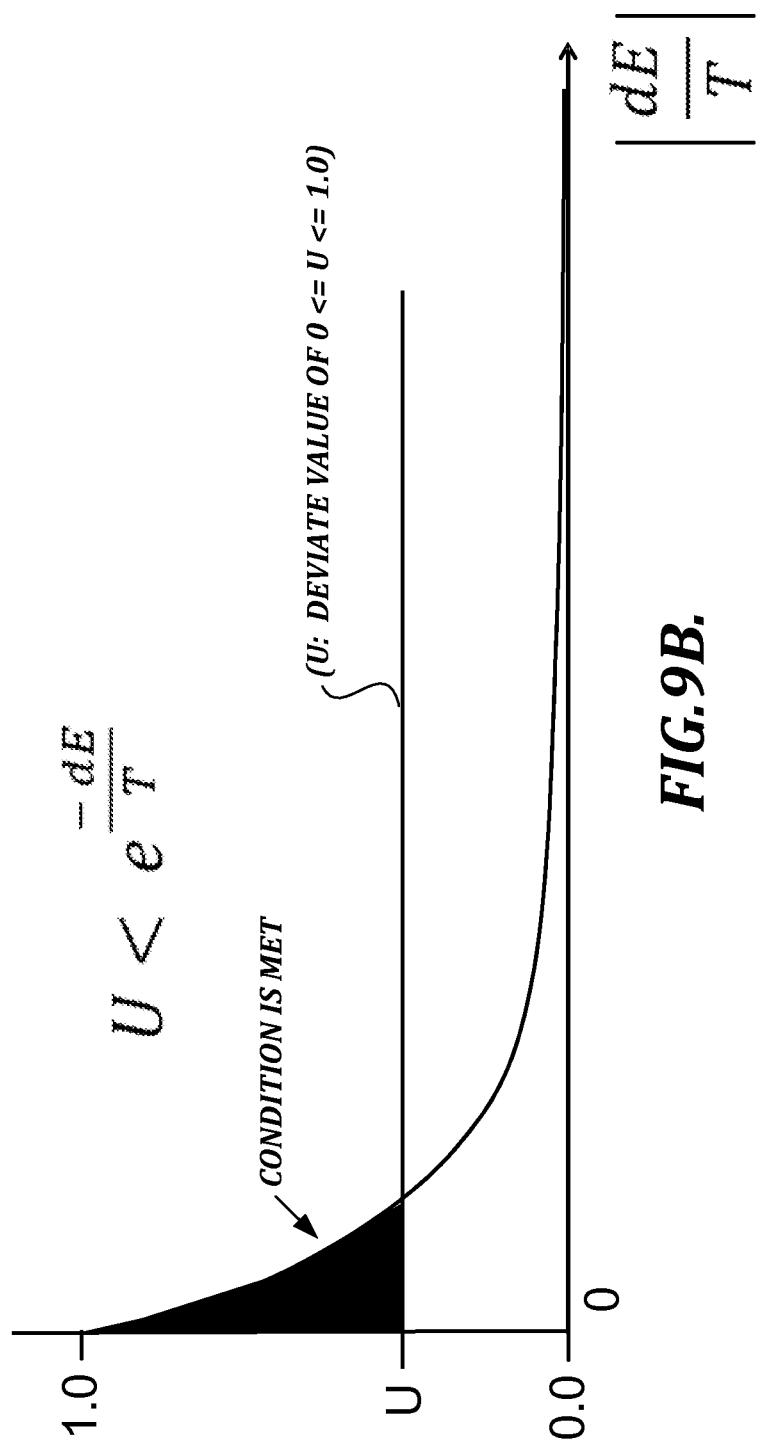
FIG. 9B is a graph that illustrates conditions for allowing increases in energy during an annealing process used in a handwriting verification process.

Referring now to the example annealing process illustrated in FIG. 9A, at step S201 the variables E (energy), T (temperature), I_step, and I_cycle are initialized. At step S203, the linkage is changed. In this context, the term "linkage" is used to refer generally to the one or more links between the test sample and the reference sample. Therefore, at step S203, the set of links between the test sample and reference sample is changed in some way. (An example process by which the set of links can be changed is described in detail below with reference to FIG. 9C.)

At step S205, the total energy of the changed linkage (E_new) is compared with the total energy of the previous state of the linkage (E_prev). If E_new is less than or equal to E_prev, the change to the linkage is retained at step S207. If E_new is greater than E_prev, a determination is made at step S217 as to whether the change to the linkage can still be accepted.

In at least one embodiment, increases in energy may be accepted depending on a ratio involving the magnitude of the change (dE) and the current temperature. In the example shown in FIG. 9B, increases in energy (positive dE) are allowed when the following condition is met:

$$U < e^{\frac{-dE}{T}}$$

where U is a uniform deviate value in the range of $0 \le U \le 1.0$, dE is the change in overall energy resulting from the change to the linkage, and T is the current temperature of the system. A uniform deviate is used to generate one or more pseudo-random values U. A single uniform deviate generator is used for the entire comparison between the test sample and the reference sample, and it is always initialized with the same seed. This ensures that the comparison of the test sample and the reference sample always returns the same result.

Figure 9C:
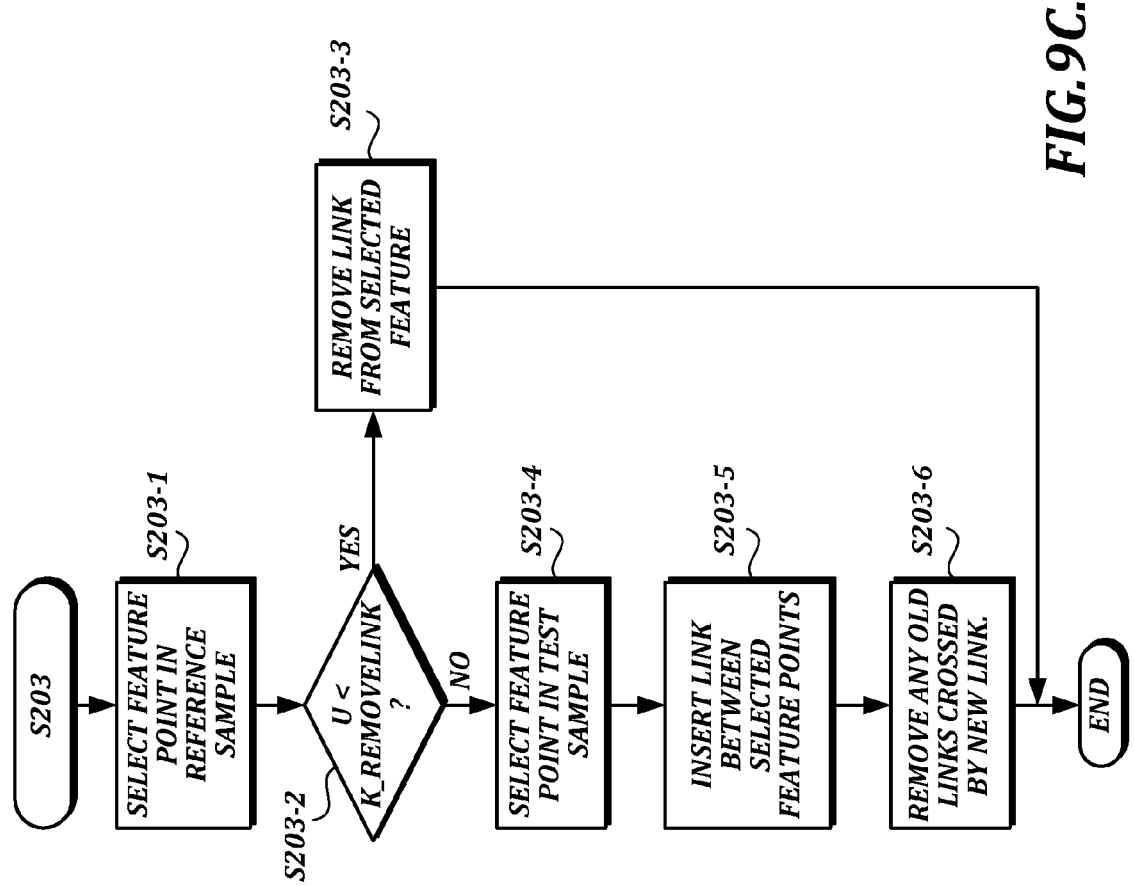
FIG. 9C is a flow chart of an example process by which a set of links can be changed in an annealing process used in a handwriting verification process.
Figure 9D:
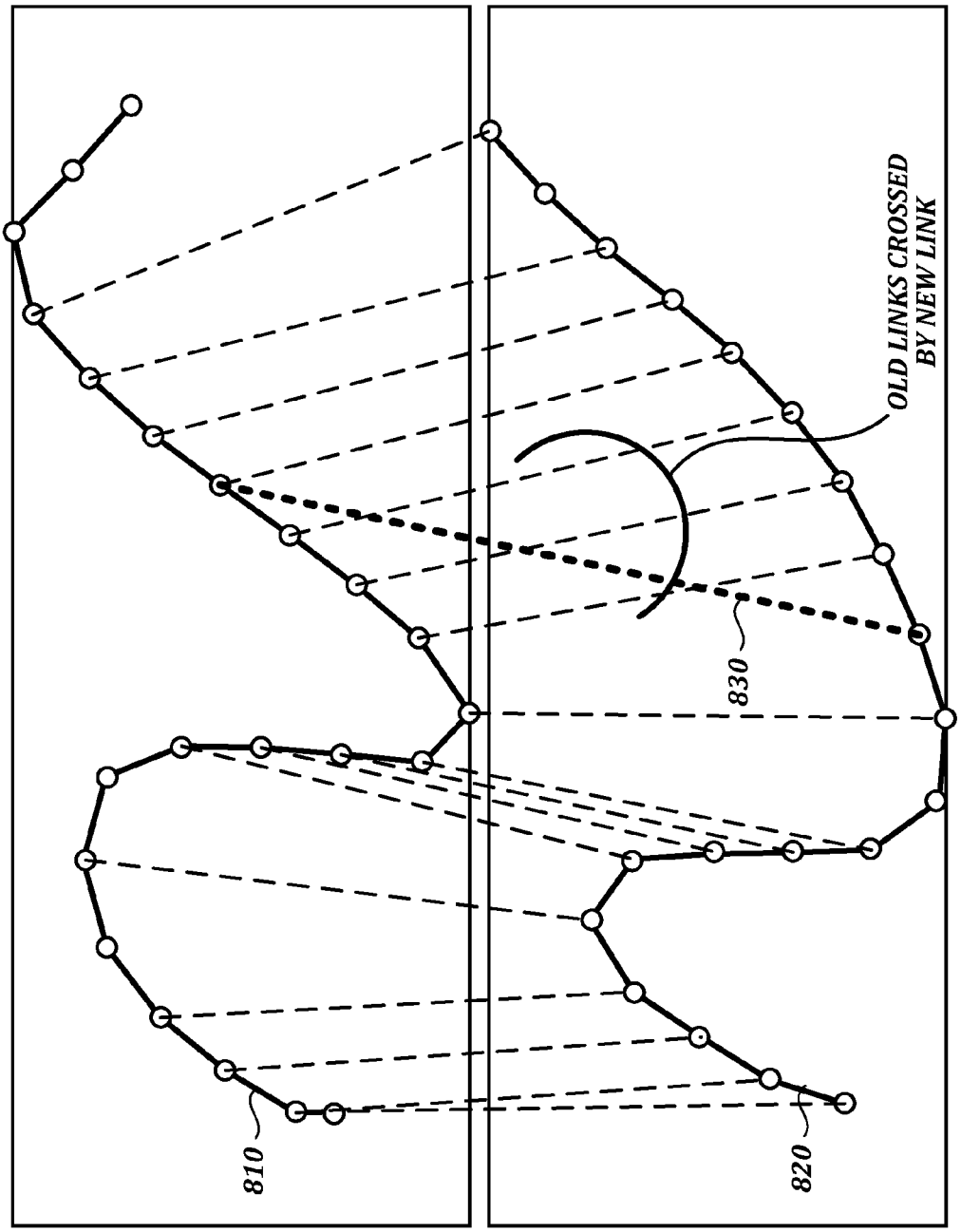
FIG. 9D is diagram of an illustrative change in a set of links during an annealing process used in a handwriting verification process.

An example process by which the linkage can be changed (see step S203 in FIG. 9A) will now be described with reference to FIG. 9C. At step S203-1, a feature point is selected in a reference sample. At step S203-2, a determination is made as to whether the uniform deviate value U is less than the constant K_RemoveLink.

In at least one embodiment, step S203-2 is performed at each change to the linkage by pseudo-randomly determining to either remove a link or set a new link by comparing the value U with the constant K_RemoveLink. The value of K_RemoveLink can be set to bias the determination towards either removing an existing link or setting a new link. Experiments indicate that it is desirable if about 30% of the changes consist of removing the link, in which case K_RemoveLink would be set to 0.3. The value of constant K_RemoveLink can vary depending on implementation.

If U is less than K_RemoveLink, the link is removed from the selected feature point at step S203-3. (This step allows the annealing process to remove a link without inserting any others to replace it, to ensure that more possible changes to the linkage are achievable.) Otherwise, a feature point in the test sample is selected at step S203-4, and a link is inserted between the selected feature points in the reference sample and the test sample at step S203-5. At step S203-6, any previously existing links that are crossed by the newly inserted link are removed from the linkage. In the example shown in FIG. 9D, a new link 830 crosses three previously existing links, which are removed from the linkage according to the example process described in FIG. 9C.

In general, it is desirable to ensure that enough changes are made to the linkage to allow the minimum energy state to be achieved and to ensure that the temperature is reduced sufficiently to allow the solution to settle in an optimal state. Referring again to FIG. 9A, steps S209-S215 are used to determine whether the annealing process has reached its end. In the example shown in FIG. 9A, I_cycle is incremented at step S211 until a maximum value (Max_cycles) is reached (see step S209), and I_step is incremented at step S215 until a maximum value (Max_steps) is reached (see step S213). When I_step is incremented at step S215, the temperature (T) of the overall system also is reduced by multiplying T by a cooling factor (K_cool). The number of steps is the number of temperature changes that are made, with the temperature being reduced by the cooling factor at each stage. The number of cycles is the number of changes that are attempted at each temperature level. Values such as Max_cycles, Max_steps, and K_cool can vary depending on implementation.

The annealing process can be made more accurate, at the possible expense of processing speed, by using a larger number of cycles and more gradual temperature reductions. In at least one embodiment, annealing parameters (e.g., number of cycles, cooling factor for temperature reductions) are chosen to get adequate accuracy quickly in the majority of cases. However, this can occasionally result in poor linkage between two samples that would otherwise have acceptable linkage if the annealing was adequate.

To help determine whether poor linkage is a result of dissimilarity between samples or an inaccurate initial annealing process, a second annealing process can be performed with a different initial seed. An example process by which annealing can be repeated is illustrated in FIG. 9E. At step S301, a uniform deviate is initialized to a fixed value. At step S303, an annealing process is performed, such as the process shown in FIG. 9A. At step S305, if a good match is found between the two samples, a determination is made at step S311 that the samples are consistent. Other attributes (e.g., time values, pressure values, angle values) also can be checked at step S315 to confirm the consistency of the samples.

If a good match is not found at step S305, a check is performed at step S307 to determine whether another annealing attempt will be made. The check performed at step S307 may involve comparing the number of annealing steps already performed with a maximum value. For example, in at least one embodiment, if 2 annealing attempts have not been made yet, the annealing step S303 is repeated without resetting the uniform deviate generator in order to guarantee that the same random sequence will not be used in the subsequent annealing step. Otherwise, with 2 annealing attempts having been made, a determination is made at step S313 that the samples are inconsistent.

After annealing has been performed, the resulting linkage will include a set of links, each with a known energy. However, not all feature points will be linked unless the samples are identical or nearly identical. The quality of the linkage can be assessed by calculating a proportion ($P_l$) of the feature points that are linked and the mean link energy ($E_m$) according to the following equations:

$$P_l = \frac{2n_l}{n_r + n_c}$$

$$E_m = \frac{\Sigma e_i}{n_l}$$

where $P_l$ is the proportion of features that are linked, $n_l$ is the total number of links, $n_r$ is the number of features in the reference sample, and $n_t$ is the number of features in the test sample. In embodiments that use the above equations to assess linkage quality, consistent signatures will have high values of $P_l$ and low values of $E_m$. Conversely, dissimilar samples will have low values of $P_l$ and high values of $E_m$.

Figure 10:
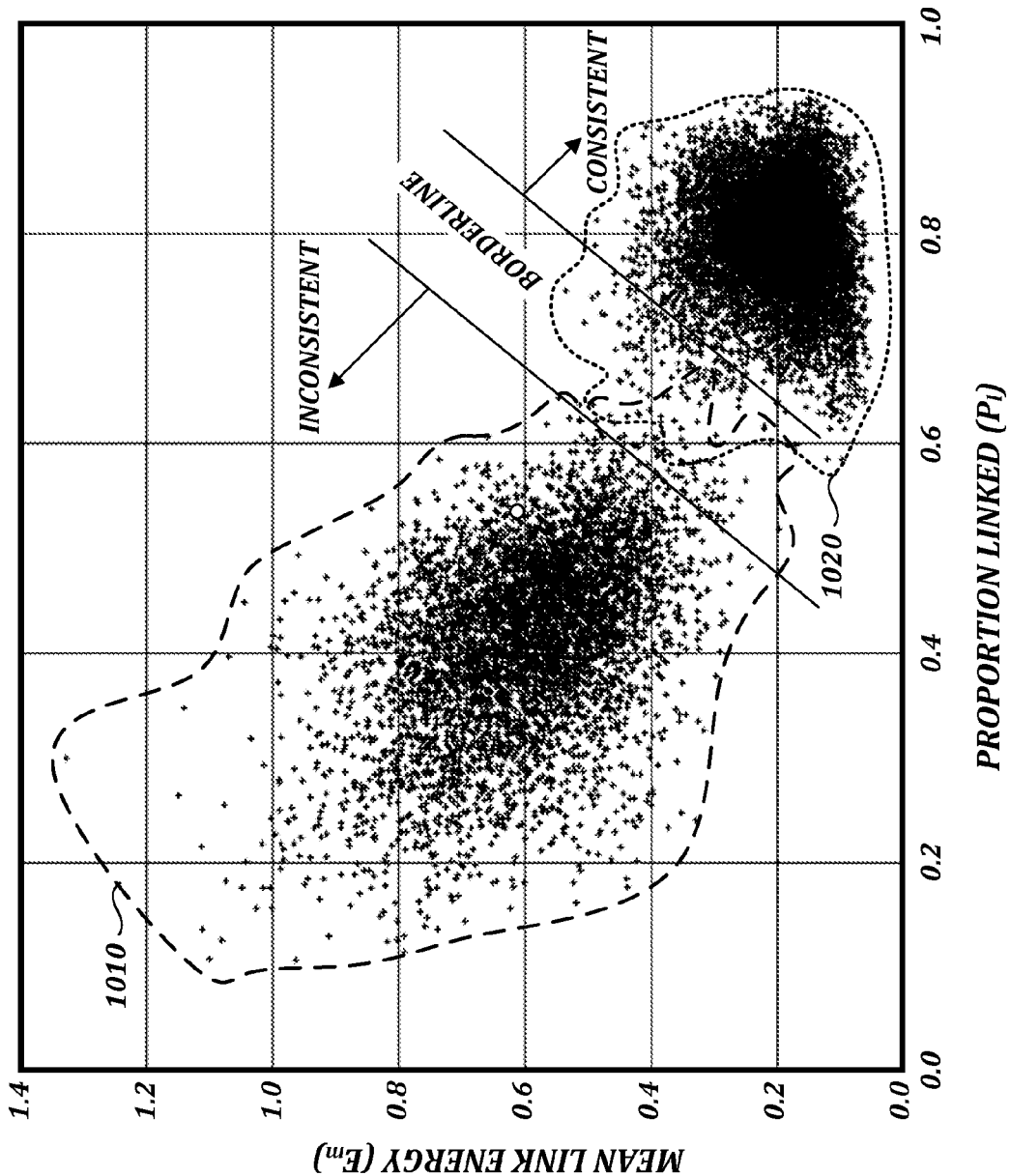
FIG. 10 is a graph showing results from a test in which the proportion of features that are linked and the mean link energy for a large number of signatures have been plotted.

The expected difference in $P_l$ and $E_m$ values for consistent signatures and inconsistent signatures can be measured empirically. In FIG. 10, results are shown from a test in which the proportion $P_l$ and the mean link energy $E_m$ for a large number of signatures have been plotted. The plot points in the region 1010 within the dashed line are each associated with a comparison of samples that are from different people and therefore likely to be inconsistent. The plot points in region 1020 within the dotted line are each associated with a comparison samples that are from the same person and therefore likely to be consistent.

In the example shown in FIG. 10, a large majority of data points in region 1010 reflect $P_l$ and $E_m$ values associated with inconsistent samples, and a large majority of data points in region 1020 reflect $P_l$ and $E_m$ values associated with consistent samples. There is some overlap between the regions 1010 and 1020 in an area labeled as "borderline," in which the $P_l$ and $E_m$ values do not clearly indicate whether the samples are consistent or inconsistent. However, the results in FIG. 10 show that it is possible in many cases to make an initial assessment of whether the test sample and the reference sample are consistent based on handwriting geometry. In at least one embodiment, test samples that are identified as inconsistent at this stage are automatically given a verification score of 0, and no further processing is done to determine whether the test sample is consistent with the reference sample.

Although the $P_l$ and $E_m$ values are effective for measuring linkage quality in many scenarios, they may not reflect significant differences between a test sample and a reference sample if a substantial portion of the samples are very similar. It is possible to improve the accuracy of handwriting verification by performing an additional check to determine whether there is a significant section of unlinked feature points between the test sample and the reference sample.

Referring again to FIG. 4, at step S109 a determination is made as to whether the test sample and the reference sample are a sufficient match. In the example shown in FIG. 4, if the test sample and the reference sample are determined to be a sufficient match at step S109, then further processing is performed (see step S111, described in further detail below) before outputting a result of the verification at step S113. However, if the test sample and the reference sample are determined not to be a sufficient match at step S109, a result showing the samples to be inconsistent can be output at step S113 without further processing.

The output produced at step S113 can be any output that is suitable to indicate a result of the verification, such as a Boolean value. Alternatively, a different value that allows for indicating more than just a binary or true/false result can be used. In least one embodiment, the output produced at step S113 comprises a floating point value ranging from 0 (indicating that the test sample and the reference sample are very different) to 1.0 (indicating that the test sample and the reference sample are very similar).

Figure 11:
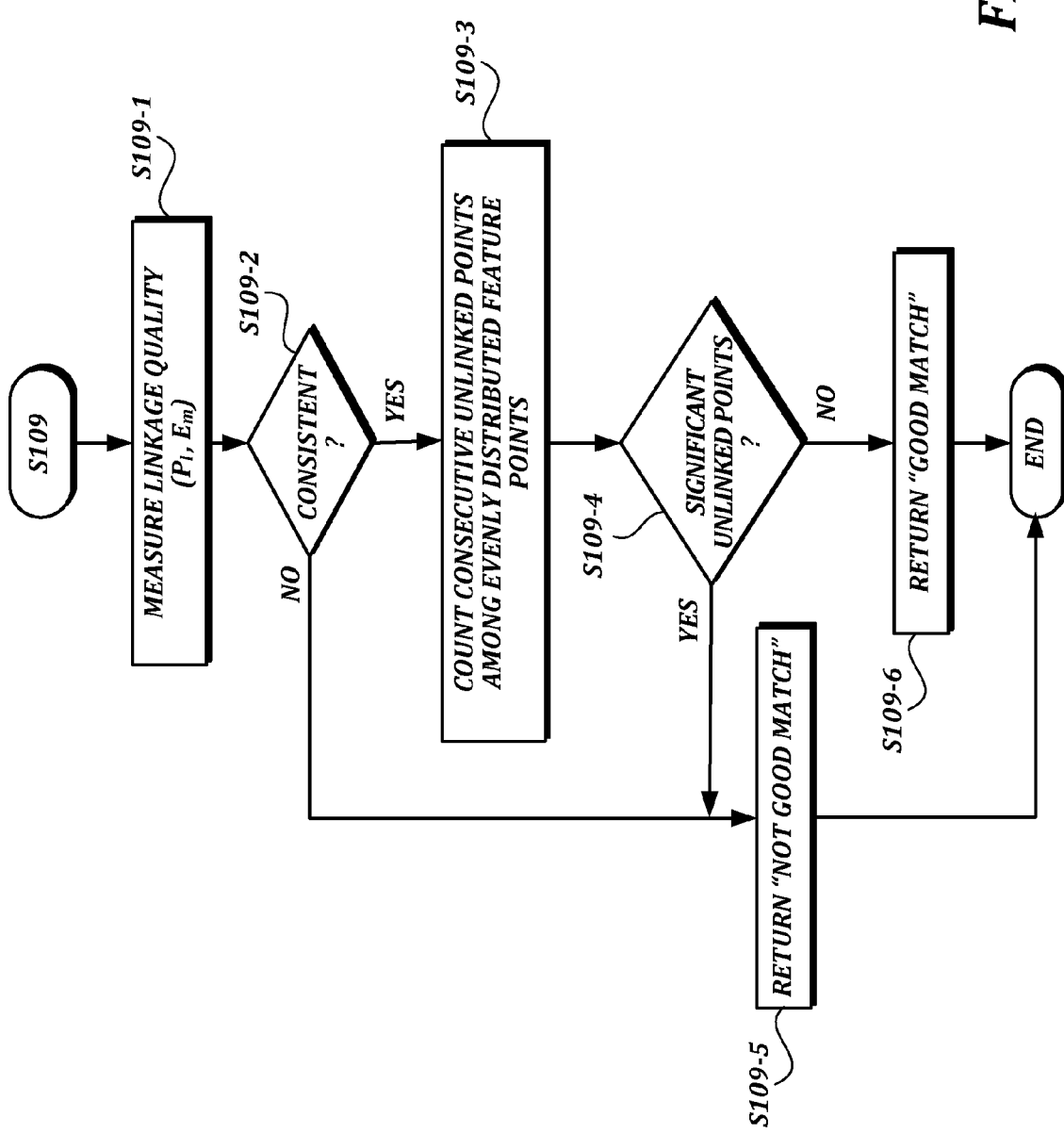
FIG. 11 is a flow chart of an example sample matching process that includes a count of consecutive unlinked feature points.

FIG. 11 illustrates an example matching process S109 that includes a count of consecutive unlinked feature points. In the example shown in FIG. 11, at step S109-1 an initial measure of linkage quality is performed by determining $P_l$ and $E_m$ values for linkage between a test sample and a reference sample. As mentioned above with reference to FIG. 10, at step S109-2, if the values of $P_l$ and $E_m$ indicate that the test sample and the reference sample are not consistent, the process S109 returns a result indicating that the test sample and the reference sample are not a good match (not consistent) at step S109-5, and further processing in the matching process S109 can be omitted. However, if the values of $P_l$ and $E_m$ indicate that the test sample and the reference sample are consistent, at step S109-3 consecutive unlinked feature points are counted.

Figure 12A:
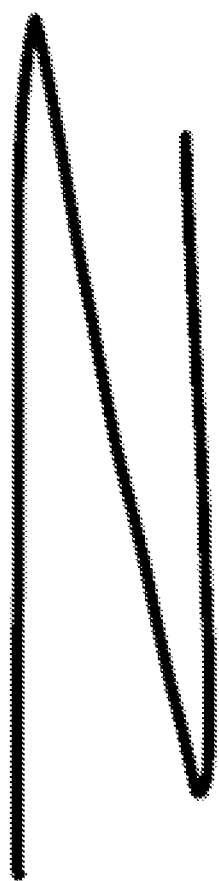
FIGS. 12A and 12B are illustrations of a test sample and a reference sample, respectively, that may be processed according to a sample matching process that includes a count of consecutive unlinked feature points.
Figure 12B:
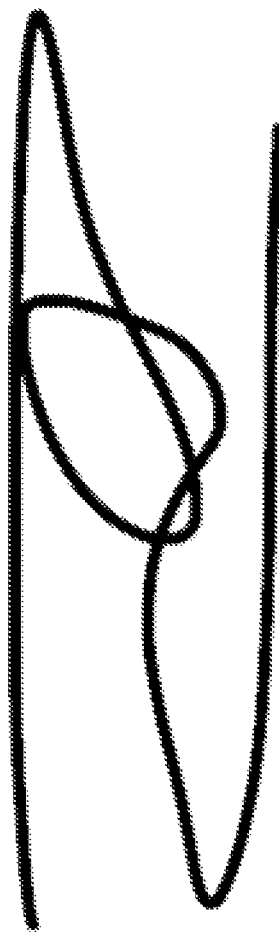

FIGS. 12A and 12B depict a test sample and a reference sample, respectively, that may be processed according to the matching process S109 illustrated in FIG. 11. FIG. 12A depicts an example test sample having a "Z" shape, and FIG. 12B depicts an example reference sample having a similar "Z" shape, but with an additional loop. Substantial portions of the two samples depicted in FIGS. 12A and 12B are identical or very similar. Thus, a high proportion of the features depicted in FIGS. 12A and 12B may be linked with very low link energies. The additional loop in the reference sample shown in FIG. 12B may be unlinked, but the overall linkage and link energy may be similar to what would be expected in natural variations among authentic signatures.

The samples depicted in FIGS. 12A and 12B are illustrative of a scenario in which the values of $P_l$ and $E_m$ may indicate that the test sample and the reference sample are consistent, despite a significant missing feature in the test sample. An additional check for consecutive unlinked feature points (as illustrated in FIG. 11) may be used to improve the accuracy of the matching process. In the illustrative scenario depicted in FIGS. 12A and 12B, the matching process illustrated in FIG. 11 may be used to determine that the respective samples are not consistent due to the missing feature.

Referring again to FIG. 11, at step 109-4 a determination is made whether the unlinked feature points are significant. If the unlinked feature points are significant, the process S109 returns a result indicating that the test sample and the reference sample are not a good match (not consistent) at step S109-5. If the unlinked feature points are not significant, the process S109 returns a result indicating that the test sample and the reference sample are a good match (consistent) at step S109-6.

In at least one embodiment, determining whether the unlinked feature points are significant includes determining whether the count of consecutive unlinked features points in an unlinked section is greater than a predetermined value $N_U$. Counts that are greater than $N_U$ can be added, and the total length of these counts can be represented as a proportion (referred to as "proportion free," or $P_f$) of the overall sample length. Counts that are less than or equal to $N_U$ can be ignored. The value of $N_U$ can vary depending on implementation. Samples with a $P_f$ value exceeding a predetermined value can be deemed inconsistent.

Referring again to FIG. 4, if a test sample and a reference sample have been initially determined to be a sufficient match at step S109 based on handwriting geometry, additional evaluation is performed at step S111 using other pen event parameters that are not limited to handwriting geometry.

In at least one embodiment, the additional evaluation performed at step S111 comprises non-geometric feature matching, which can include analysis of time-related pen event parameters, such as writing speed. Individuals tend to develop a habitual rhythm in the way they write with a pen, which means that pen speed and acceleration tend to be very similar (though not identical) for handwriting (e.g., signatures) made by the same person. Thus, time-related pen event parameters, which differ from the geometric features that are analyzed in other steps, can be useful in a handwriting verification process (e.g., as a supplement to geometric feature matching). In at least one embodiment, geometric features can be extracted from raw handwriting data along with elapsed time corresponding to the respective features, allowing comparison of elapsed time values.

Figure 13:
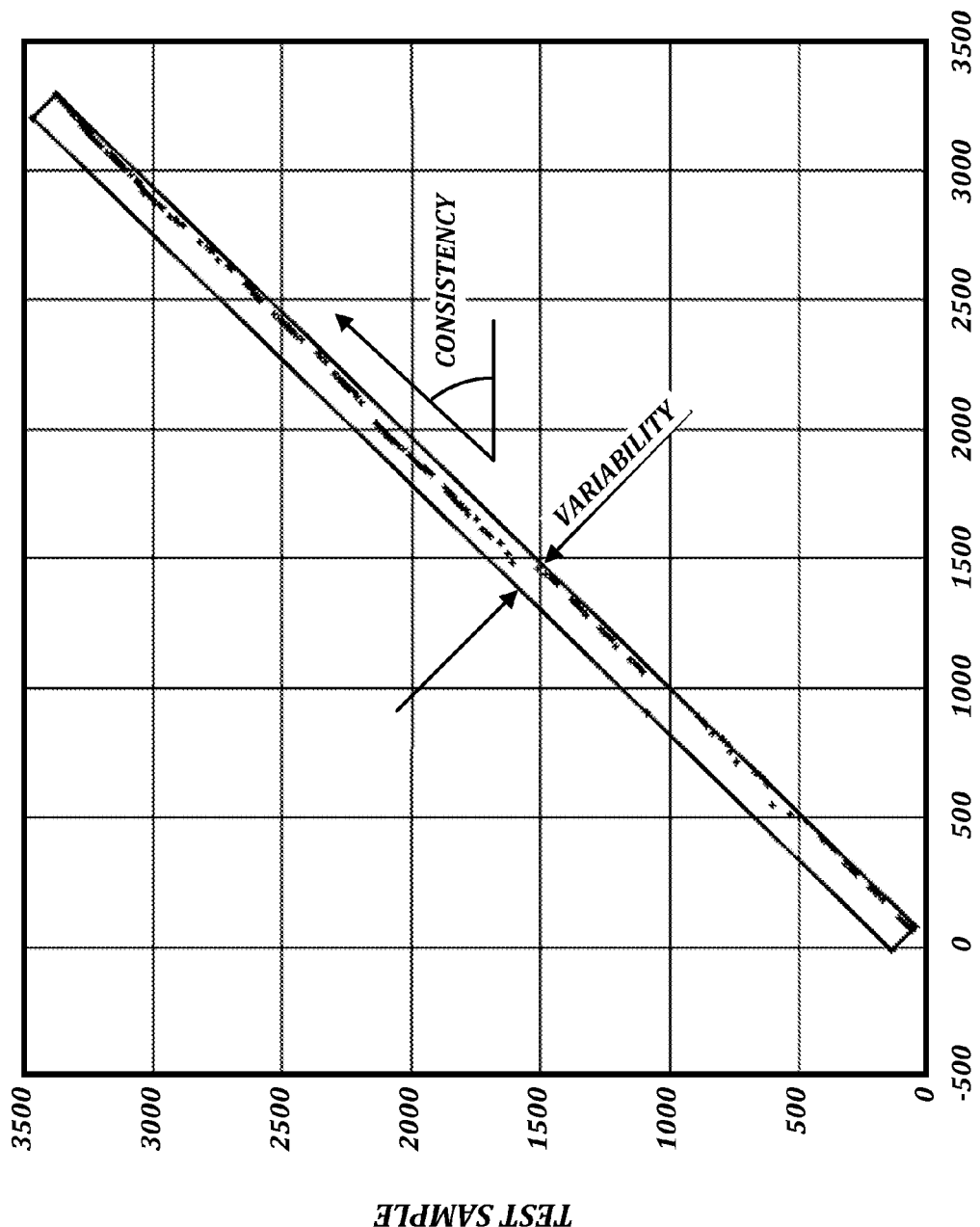
FIG. 13 is a graph that illustrates results of comparison of elapsed time values corresponding to feature points in two handwriting samples.

FIG. 13 is a graph that illustrates results of comparison of elapsed time values corresponding to feature points in two handwriting samples. The results are illustrated in FIG. 13 as a plot corresponding to elapsed time for linked feature points. Each point in the plot corresponds to a link and represents the elapsed time to a feature point in a reference sample (horizontal axis) and the elapsed time to a linked feature point in a test sample (vertical axis). For signatures that are consistent, the elapsed time from the start of the signature should be similar for each pair of linked feature points.

In the example shown in FIG. 13, the points are plotted inside a rectangle that represents overall consistency (by the rectangle's diagonal slope, or angle from the horizontal) and variability (by the rectangle's narrower dimension, as indicated by the perpendicular arrows) of speed. Overall consistency in this context refers to the average total time elapsed (and therefore the speed) of the respective samples. In this example, the rectangle's slope of approximately 1:1 indicates that the samples have a consistent average speed. Variability in this context refers to differences in local changes in speed. Acceptable limits in overall consistency and variability of speed can be measured through testing of signature samples that are known to be made by the same person.

Referring again to FIG. 4, the additional evaluation performed at step S111 also can include analysis of other parameters, such as pen pressure or pen angles. Pen pressures can be reliably compared by assessing the status (e.g., increasing, decreasing, or steady) of the pressure at each feature point. Consistency of pressure can be calculated as a proportion $P_p$ of links that have the same pressure status at each end of the link. An acceptable value of $P_p$ can be determined by measuring pressure variation in a large number of signature samples that are known to be from the same person.

Typically, pen pressures are measured as relative values, rather than as absolute force values. Pressure values are device-dependent, with variations in sensitivity occurring even between devices of the same model due to factors such as differences in construction, hysteresis, and aging of pen materials. Thus, it is not generally possible to make reliable comparisons between samples using absolute force values, particularly if the same person may have used different input devices to provide the samples.

Figure 14:
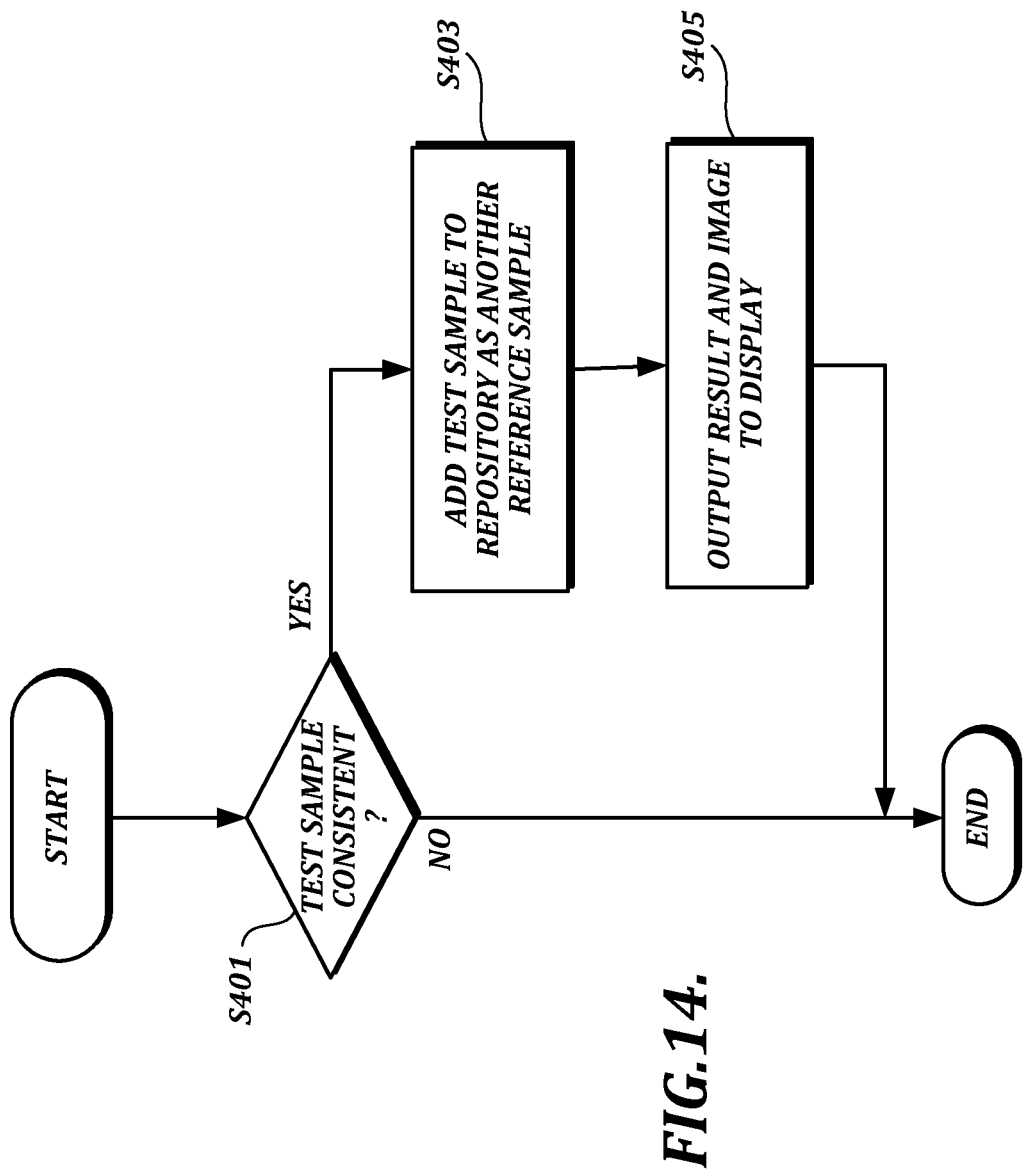
FIG. 14 is a flow chart of an example post-processing process that can be used after a determination has been made as to whether a test sample is consistent or inconsistent with a reference sample.

FIG. 14 is a flow chart of an example post-processing process that can be used after a determination has been made as to whether a test sample is consistent or inconsistent with a reference sample. In the example process illustrated in FIG. 14, if a test sample is determined to be consistent with a reference sample at step S401, the test sample can be added to a repository as another reference sample at step S403. When a test sample is found to be consistent with a reference sample, the test sample can be used to supplement existing reference samples and potentially improve the accuracy of future verification processes. Further, in the example process illustrated in FIG. 14, at step S405 the verification result can be output along with separate image data that can be rendered for display. For example, if the handwriting data for the test sample was integrated with image data, an image of the handwriting can be displayed along with an indicator of the result of the verification process (e.g., whether the handwriting has been verified or not).

Figure 15:
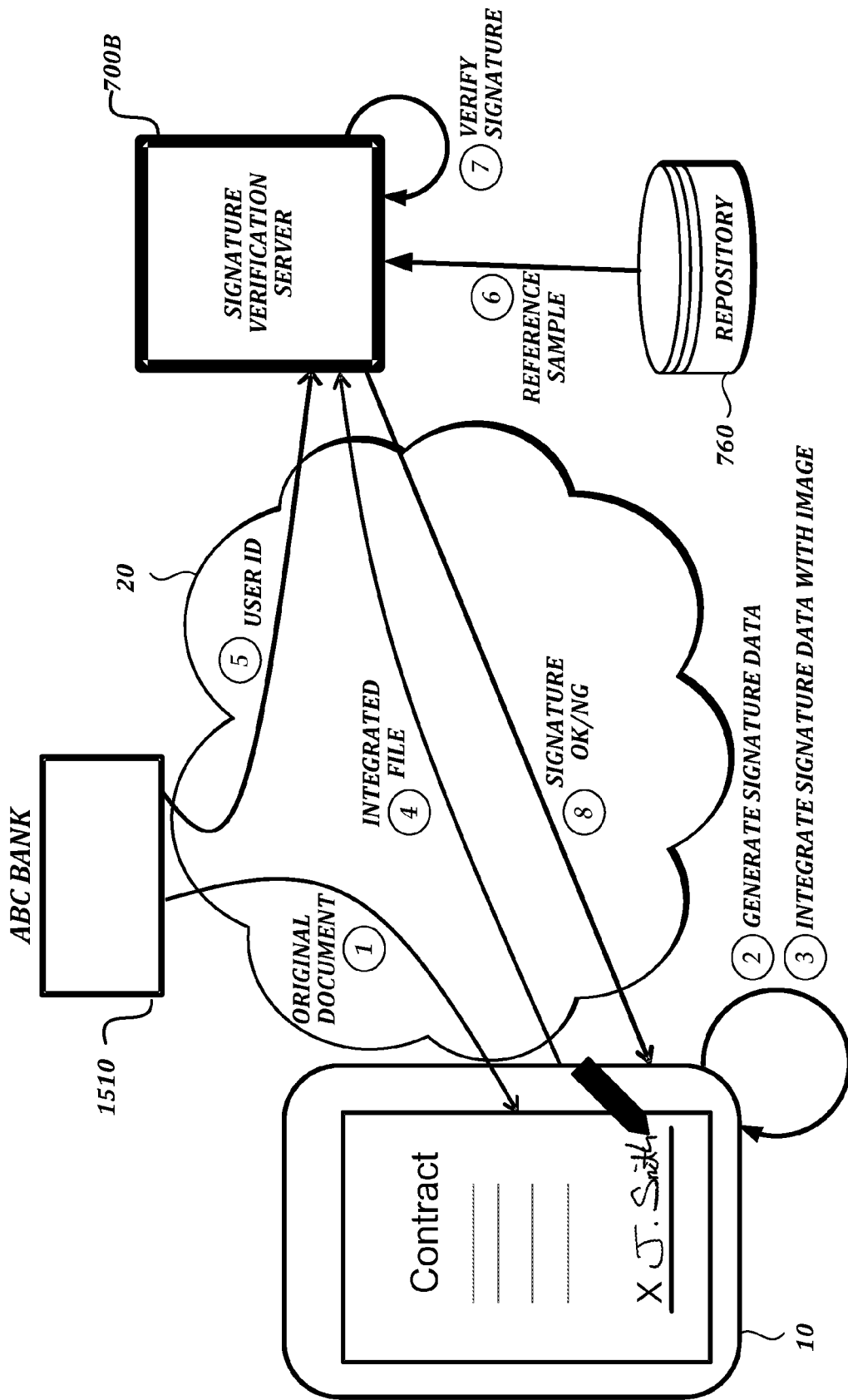
FIG. 15 is a diagram of an illustrative computer system and process for verifying authenticity of a signature.

FIG. 15 is a diagram of an illustrative computer system and process for verifying authenticity of a signature. The particular signature verification techniques that may be used in the system and process depicted in FIG. 15 can vary from those described herein, depending on implementation. In the example shown in FIG. 15, the signature is made on a contract in a banking context.

As shown in FIG. 15, a server 1510 provided by ABC Bank provides an original contract document to a handwriting input device 10 for signature. The input device 10 generates signature data in response to a user's signing the contract and integrates the signature data with an image of the signed contact. The input device 10 provides the integrated file to a signature verification server 700B over a network 20 (e.g., the Internet). The handwriting input device 10 may be implemented as a dedicated handwriting collection device or as a general purpose device, such as a suitably configured smart phone or tablet computer with pen input capability.

In the example shown in FIG. 15, the server 1510 (or some other server controlled by ABC Bank) provides a user ID to the signature verification server 700B. The signature verification server 700B uses the user ID to select an appropriate reference signature in repository 760 to use in a verification process.

FIG. 16 depicts a table 1690 that the signature verification server 700B can use to look up a reference signature based on one or more identifiers (e.g., a service ID (which identifies the entity that provided the document for signature) and the user ID provided by the server 1510). The service ID may be provided by the server 1510, the input device 10, or some other entity. As shown in table 1690, the reference signature can be in any language, and more than one reference signature may be available for a single user.

Referring again to FIG. 15, the signature verification server 700B verifies the signature provided by the input device 10 by comparing the signature with the reference signature. The signature verification server 700B returns a result of the verification to the input device 10 indicating whether the signature is verified ("OK") or not verified ("NG").

Figure 17:
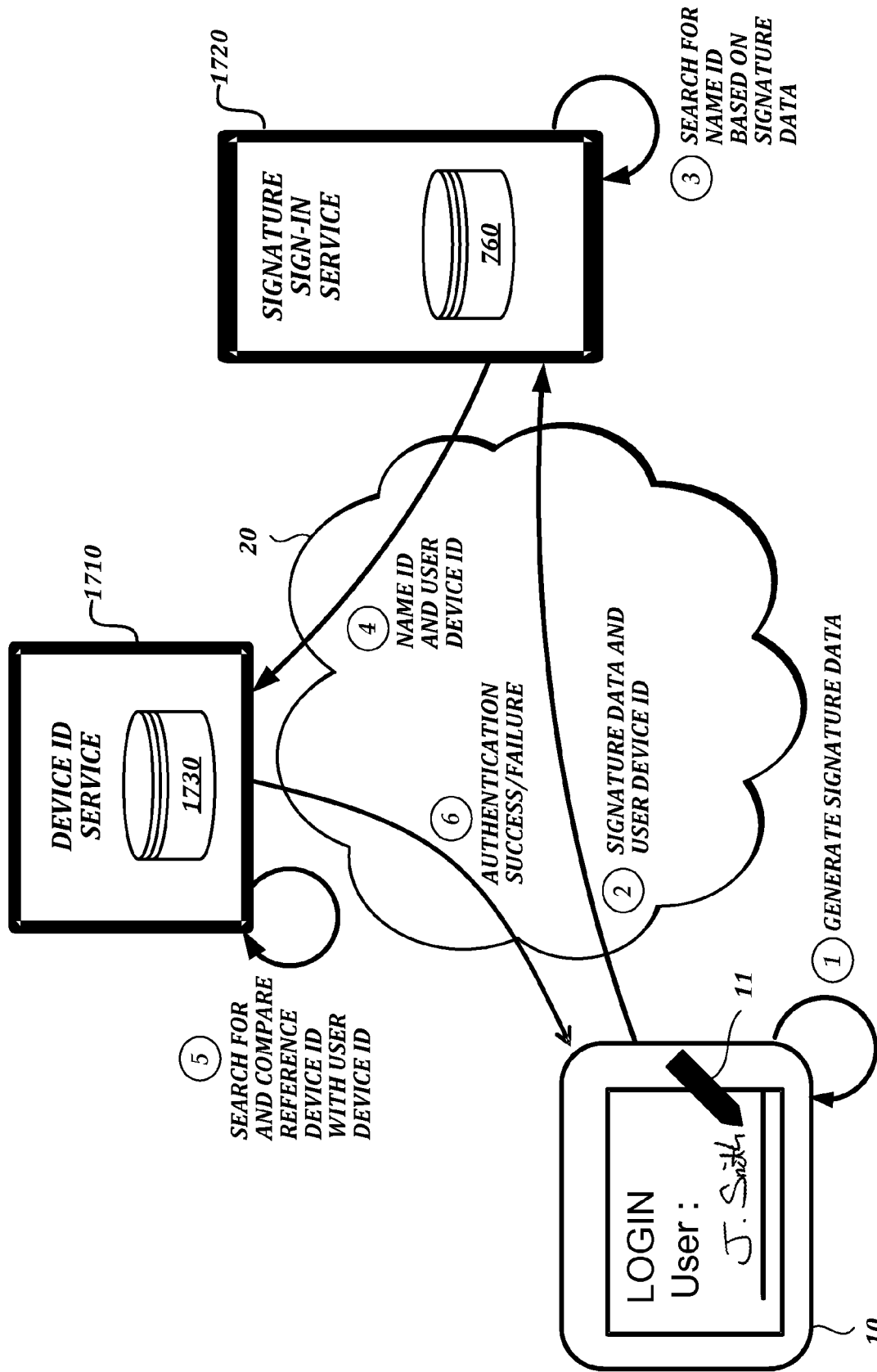
FIG. 17 is a diagram of an illustrative handwriting-based user authentication process in a suitably configured computing system.

FIG. 17 is a diagram of an illustrative computer system and handwriting-based user authentication process that can be used to authenticate a user based on the user's signature. The illustrative computer system and handwriting-based user authentication process depicted in FIG. 17 may use handwriting verification techniques described herein or other handwriting verification techniques for user authentication, depending on implementation.

In the example shown in FIG. 17, an input device 10 generates test signature data in response to a user attempting to sign in to a computer system by signing with a pen/stylus device 11. The input device 10 provides the signature data along with a user device ID (e.g., a stylus ID associated with the pen/stylus device 11) to a signature sign-in service 1720 over a network 20 (e.g., the Internet).

In the example shown in FIG. 17, the signature sign-in service 1720 searches for a "name ID" based on the test signature data provided by the input device 10. The signature sign-in service 1720 can use a verification process to determine whether the test signature data provided by the input device 10 is consistent with corresponding reference signature data associated with one or more reference signatures stored in database 1730.

FIG. 18A is an illustration of a table that can be used to look up an identifier (e.g., in database 1730) based on signature data. In particular, FIG. 18A depicts a table 1890 that the signature sign-in service 1720 can use to look up a name ID (e.g., a local ID combined with a service ID) based on the signature data provided by the input device 10. The local ID may be associated with a user, and the service ID may be associated with a device ID service 1710 (see FIG. 17).

Referring again to FIG. 17, the signature sign-in service 1720 sends the user device ID and the name ID (e.g., local ID plus service ID) to the device ID service 1710. FIG. 18B is an illustration of a table that can be used to look up a reference device ID (e.g., a stylus ID) based on other identifiers. In particular, FIG. 18B depicts a table 1892 that the device ID service 1710 can use to look up a reference device ID that corresponds to the name ID provided by the signature sign-in service 1710. If the reference device ID in the table entry matches the user device ID sent by the signature sign-in service 1720, the device ID service 1710 can send authentication information back to the input device 10. In the example shown in FIG. 17, the authentication information includes an authentication result of "success" or "failure." In addition to the success/failure result, the authentication information transmitted in this example can include (e.g., in the case of "success") a user ID and password that may be required to complete the log-in process.

Figure 19A:
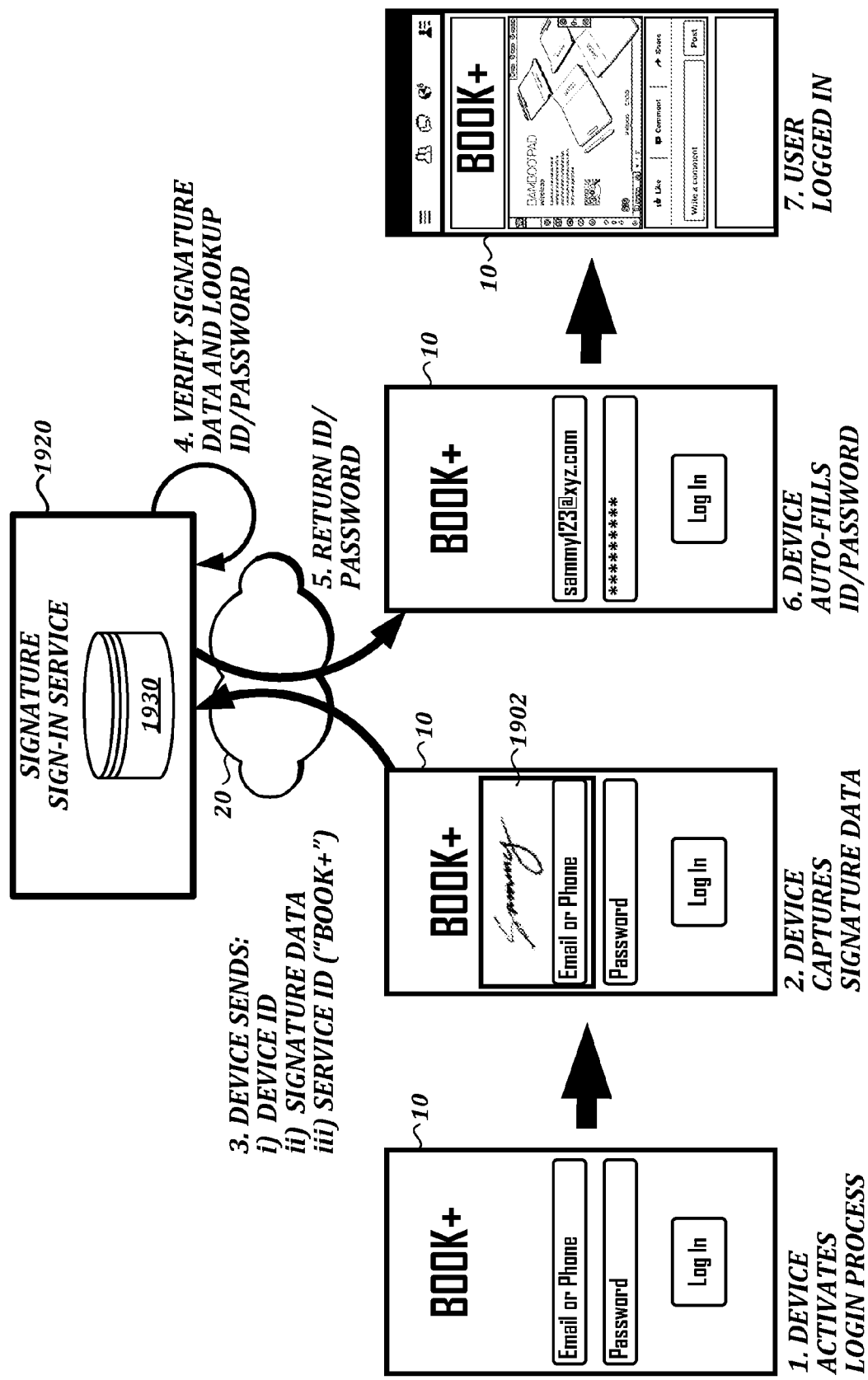
FIG. 19A is a diagram of another illustrative handwriting-based user authentication process in a suitably configured computing system.

FIG. 19A is a diagram of another illustrative handwriting-based user authentication process in a suitably configured computing system. In this example, the user authentication process is a log-in process that is used to provide access to a social network service called "Book+"; however, other services can be accessed in a similar way.

As shown in FIG. 19A, a handwriting input device 10 activates a log-in process associated with a service (e.g., by navigating to a website associated with the service using a browser application or by activating a dedicated application associated with the service). The device 10 captures signature data (e.g., in a signature area 1902), which may be generated in response to a user signing with a pen/stylus device (not shown). The device 10 sends the signature data as test signature data to be verified. The test signature data is sent along with a device ID associated with the device 10 and/or a pen/stylus device and a service ID (e.g., "Book+") associated with the service to a signature sign-in service 1920 over a network 20 (e.g., the Internet).

In the example shown in FIG. 19A, the signature sign-in service 1920 verifies the test signature data (e.g., by comparing the test signature data with reference signature data in accordance with techniques described herein or other techniques) and obtains authentication information (e.g., user ID and password information) based at least in part on the results of the verification. The signature sign-in service 1920 is implemented as a "one-pass" sign-in service that allows a user to be authenticated using a single instance of user input (a signature) rather than requiring multiple instances of user input (e.g., a user ID and a password) to be provided by the device 10.

FIG. 19B depicts a table 1990 that illustrates information that can be provided to a signature sign-in service (e.g., sign-in service 1920) to authenticate a user, along with authentication information (e.g., user ID and password) that can be returned from the signature sign-in service if the user authentication is successful. In the example shown in FIG. 19B, a pen/device ID, signature data associated with a test signature to be verified, and a service ID (e.g., "Book+") can be received from a user device (e.g., input device 10) and used to authenticate a user of the user device with respect to the service identified by the service ID.

Referring again to FIG. 19A, the signature sign-in service 1920 can use information such as the device ID and the service ID to look up one or more reference signatures associated with a user in the database 1930. The signature sign-in service 1920 can then use a handwriting verification process to determine whether the signature data provided by the input device 10 is consistent with the reference signature(s). Once the user has been authenticated with the signature sign-in service 1920, the service 1920 can transmit the user ID and password to the device 10. The user ID and password can then be used to complete the log-in process.

For example, the device 10 can automatically fill in the user name (e.g., an email address) and password in appropriate fields in a user interface.

In practice, any collection of information that allows a user to be reliably authenticated by a signature sign-in service (e.g., signature sign-in service 1920) can be used for user authentication. The particular information that may be used to look up a particular user in a database (e.g., database 1930) can vary depending on factors such as the information that is transmitted to the signature sign-in service, the information that is stored in the database, and the way the database is designed.

For security purposes, any information relating to handwriting verification and related user authentication processes (e.g., handwriting data, device identifiers, service identifiers, authentication information, etc.) may be encrypted (e.g., using symmetric (e.g., shared-secret-key) or asymmetric (e.g., public-key) encryption). Encrypted information may be decrypted before further processing is performed on the underlying information. For example, encrypted test signature data may be decrypted prior to comparing the test signature data with reference signature data.

Unless otherwise specified in the context of specific examples, described techniques and tools may be implemented by any suitable computing devices, including, but not limited to, laptop computers, desktop computers, smart phones, tablet computers, and/or the like. For example, although generation of handwriting data in some examples described herein may require certain hardware features, such as an electronic pen, the raw data generated by an electronic pen may be transmitted to and processed by suitably configured general purpose computing devices, including, but not limited to, laptop computers, desktop computers, smart phones, tablet computers, and/or the like.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 20:
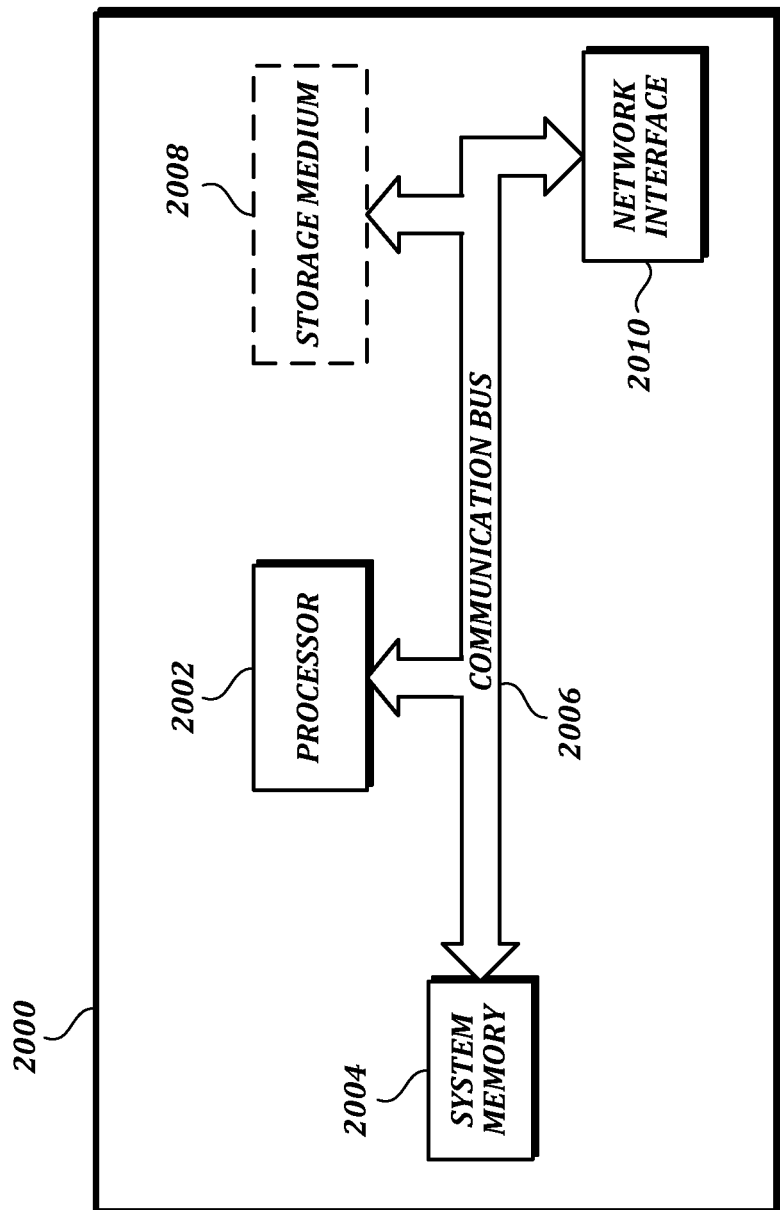
FIG. 20 is a block diagram that illustrates aspects of an exemplary computing device appropriate for use in accordance with embodiments of the present disclosure.

FIG. 20 is a block diagram that illustrates aspects of an exemplary computing device 2000 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 2000 includes at least one processor 2002 and a system memory 2004 connected by a communication bus 2006. Depending on the exact configuration and type of device, the system memory 2004 may be volatile or nonvolatile memory, such as read only memory ("ROM"), random access memory ("RAM"), EEPROM, flash memory, or other memory technology. Those of ordinary skill in the art and others will recognize that system memory 2004 typically stores data and/or program modules that are immediately accessible to and/or currently being operated on by the processor 2002. In this regard, the processor 2002 may serve as a computational center of the computing device 2000 by supporting the execution of instructions.

As further illustrated in FIG. 20, the computing device 2000 may include a network interface 2010 comprising one or more components for communicating with other devices over a network. Embodiments of the present disclosure may access basic services that utilize the network interface 2010 to perform communications using common network protocols. The network interface 2010 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 20, the computing device 2000 also includes a storage medium 2008. However, services may be accessed using a computing device that does not include means for persisting data to a local storage medium. Therefore, the storage medium 2008 depicted in FIG. 20 is optional. In any event, the storage medium 2008 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 2004 and storage medium 2008 depicted in FIG. 20 are examples of computer-readable media.

For ease of illustration and because it is not important for an understanding of the claimed subject matter, FIG. 20 does not show some of the typical components of many computing devices. In this regard, the computing device 2000 may include input devices, such as a keyboard, keypad, mouse, trackball, microphone, video camera, touchpad, touchscreen, stylus, and/or the like. Such input devices may be coupled to the computing device 2000 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 2000 (e.g., a client device), or can be integral components of the computing device 2000. In some embodiments, multiple input devices may be combined into a single, multifunction input device (e.g., a video camera with an integrated microphone). Any suitable input device either currently known or developed in the future may be used with described systems described herein.

The computing device 2000 may also include output devices such as a display, speakers, printer, etc. The output devices may include video output devices such as a display or touchscreen. The output devices also may include audio output devices such as external speakers or earphones. The output devices can be separate from and communicatively coupled to the computing device 2000, or can be integral components of the computing device 2000. In some embodiments, multiple output devices may be combined into a single device (e.g., a display with built-in speakers). Any suitable output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Extensions and Alternatives

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A handwriting verification method executed in a computer system, the method comprising:
    obtaining a test sample and a reference sample each containing a plurality of feature points, wherein each of the feature points includes:
        (i) geometric features including an x-coordinate value and a y-coordinate value, and
        (ii) a non-geometric feature;
    finding mappings between feature points of the test sample and feature points of the reference sample based on the geometric features of the test sample and reference sample, wherein the finding mappings comprises finding mappings between one or more of evenly distributed feature points in the test sample and one or more evenly distributed feature points in the reference sample; and
    after the finding mappings, comparing the non-geometric features of each of the mapped feature points of the test sample and the reference sample.

2. The method of claim 1, wherein the non-geometric feature comprises pen pressure, elapsed time, speed, or acceleration.

3. The method of claim 1, wherein the comparing is performed in the case that the mapping is determined to be a sufficient match.

4. The method of claim 1, wherein the finding mappings is done by an algorithm utilizing a pseudo-random value.

5. The method of claim 1, wherein the finding mappings is based on a count of unlinked feature points of the test sample.

6. The method of claim 1, wherein the finding mappings is based on a count of consecutive unlinked feature points in the test sample.

7. The method of claim 1, wherein the finding mappings comprises:
    determining, based on a pseudo-random value, whether to (a) remove a mapping from a selected feature point in the reference sample, or (b) define a new mapping between the selected feature point in the reference sample and a selected feature point in the test sample.

8. The method of claim 1, the geometric features further include direction (D) and curvature (C) derived from the x-coordinate values and y-coordinate values.

9. A handwriting verification method executed in a computer system, the method comprising:
    performing feature matching between geometric features of a handwriting test sample and geometric features of a reference sample, wherein the feature matching comprises defining one or more links between one or more feature points in the test sample and one or more feature points in the reference sample;
obtaining a count of consecutive unlinked feature points in the test sample; and
outputting a handwriting verification result based at least in part on the feature matching and the count of consecutive unlinked feature points in the test sample.

10. The method of claim 9, further including comparing non-geometric features of each of the linked feature points of the test sample and the reference sample.

11. The method of claim 9, wherein the feature matching includes:
initializing a pseudo-random value generator to generate a sequence of pseudo-random values, wherein the feature matching is based on a pseudo random value generated by the pseudo random value generator; and
if matching is not sufficient, performing another feature matching by the using another pseudo random value generated by the same uniform random value generator.

12. A handwriting verification method executed in a computer system, the method comprising:
obtaining a test sample and a reference sample each containing a plurality of feature points, wherein each of the feature points includes:
(i) geometric features including an x-coordinate value and a y-coordinate value, and
(ii) a non-geometric feature, wherein the non-geometric feature comprises pen pressure, elapsed time, speed, or acceleration;
finding mappings between feature points of the test sample and feature points of the reference sample based on the geometric features of the test sample and reference sample, wherein the finding mappings is done by an algorithm utilizing a pseudo-random value; and
after the finding mappings, comparing the non-geometric features of each of the mapped feature points of the test sample and the reference sample.

13. The method of claim 12, wherein the comparing is performed in the case that the mapping is determined to be a sufficient match.

14. The method of claim 12, wherein the finding mappings is based on a count of unlinked feature points of the test sample.

15. The method of claim 12, wherein the finding mappings is based on a count of consecutive unlinked feature points in the test sample.

16. The method of claim 12, wherein the finding mappings comprises:
determining, based on the pseudo-random value, whether to (a) remove a mapping from a selected feature point in the reference sample, or (b) define a new mapping between the selected feature point in the reference sample and a selected feature point in the test sample.

17. The method of claim 12, wherein the finding mappings comprises finding mappings between one or more of evenly distributed feature points in the test sample and one or more evenly distributed feature points in the reference sample.

18. The method of claim 12, wherein the geometric features further include direction (D) and curvature (C) derived from the x-coordinate values and y-coordinate values.

19. A handwriting verification method executed in a computer system, the method comprising:
obtaining a test sample and a reference sample each containing a plurality of feature points, wherein each of the feature points includes:
(i) geometric features including an x-coordinate value and a y-coordinate value, and
(ii) a non-geometric feature;
finding mappings between feature points of the test sample and feature points of the reference sample based on the geometric features of the test sample and reference sample, wherein the finding mappings is based on a count of unlinked feature points of the test sample; and
after the finding mappings, comparing the non-geometric features of each of the mapped feature points of the test sample and the reference sample.

20. The method of claim 19, wherein the non-geometric feature comprises pen pressure, elapsed time, speed, or acceleration.

21. The method of claim 19, wherein the comparing is performed in the case that the mapping is determined to be a sufficient match.

22. The method of claim 19, wherein the finding mappings is done by an algorithm utilizing a pseudo-random value.

23. The method of claim 19, wherein the finding mappings is based on a count of consecutive unlinked feature points in the test sample.

24. The method of claim 19, wherein the finding mappings comprises:
determining, based on a pseudo-random value, whether to (a) remove a mapping from a selected feature point in the reference sample, or (b) define a new mapping between the selected feature point in the reference sample and a selected feature point in the test sample.

25. The method of claim 19, wherein the finding mappings comprises finding mappings between one or more of evenly distributed feature points in the test sample and one or more evenly distributed feature points in the reference sample.

26. The method of claim 19, wherein the geometric features further include direction (D) and curvature (C) derived from the x-coordinate values and y-coordinate values.

27. A handwriting verification method executed in a computer system, the method comprising:
obtaining a test sample and a reference sample each containing a plurality of feature points, wherein each of the feature points includes:
(i) geometric features including an x-coordinate value and a y-coordinate value, and
(ii) a non-geometric feature;
finding mappings between feature points of the test sample and feature points of the reference sample based on the geometric features of the test sample and reference sample, wherein the finding mappings comprises determining, based on a pseudo-random value, whether to (a) remove a mapping from a selected feature point in the reference sample, or (b) define a new mapping between the selected feature point in the reference sample and a selected feature point in the test sample; and
after the finding mappings, comparing the non-geometric features of each of the mapped feature points of the test sample and the reference sample.

28. The method of claim 27, wherein the non-geometric feature comprises pen pressure, elapsed time, speed, or acceleration.

29. The method of claim 27, wherein the comparing is performed in the case that the mapping is determined to be a sufficient match.

30. The method of claim 27, wherein the finding mappings is done by an algorithm utilizing a pseudo-random value.

31. The method of claim 27, wherein the finding mappings is based on a count of unlinked feature points of the test sample.

32. The method of claim 27, wherein the finding mappings is based on a count of consecutive unlinked feature points in the test sample.

33. The method of claim 27, wherein the finding mappings comprises finding mappings between one or more of evenly distributed feature points in the test sample and one or more evenly distributed feature points in the reference sample.

34. The method of claim 27, wherein the geometric features further include direction (D) and curvature (C) derived from the x-coordinate values and y-coordinate values.

* * * * *